(12) United States Patent
Mikami et al.

(10) Patent No.: US 6,496,652 B1
(45) Date of Patent: Dec. 17, 2002

(54) CAMERA ENABLING THE CHANGE IN THE PRODUCT SPECIFICATIONS, AND A METHOD OF MANUFACTURING

(75) Inventors: Kazuo Mikami, Tokorozawa (JP); Yoshiaki Kobayashi, Hachioji (JP); Yukihiko Sugita, Kokubunji (JP)

(73) Assignee: Olympus Optical Co., Ltd., Tokyo (JP)

( * ) Notice: Subject to any disclaimer, the term of this patent is extended or adjusted under 35 U.S.C. 154(b) by 78 days.

(21) Appl. No.: 09/696,771

(22) Filed: Oct. 26, 2000

(30) Foreign Application Priority Data

Oct. 29, 1999 (JP) .......... 11-310147
Oct. 29, 1999 (JP) .......... 11-310148
Oct. 29, 1999 (JP) .......... 11-310149

(51) Int. Cl.[7] ............................. G03B 17/00
(52) U.S. Cl. ................. 396/299; 396/542; 396/543
(58) Field of Search ................. 396/542, 541, 396/297, 543, 299

(56) References Cited

U.S. PATENT DOCUMENTS 5,016,034 A * 5/1991 Goto .......................... 396/281
5,184,169 A * 2/1993 Nishitani ................... 396/211

FOREIGN PATENT DOCUMENTS

| JP | 55-84930 | 6/1980 |
| JP | 5-150330 | 6/1993 |
| JP | 6-43532 | 2/1994 |

OTHER PUBLICATIONS

Copy of related U.S. patent application Ser. No. 09/696,112 filed Oct. 25, 2000; Title: Specification–Variable Camera; Inventors: Hitoshi Yoshida, Masako Suzuki, Yukihiko Sugita and Yoshiaki Kobayashi.

* cited by examiner

Primary Examiner—David M. Gray
(74) Attorney, Agent, or Firm—Frishauf, Holtz, Goodman & Chick, P.C.

(57) ABSTRACT

A camera is provided which enables the selection of a plurality of specifications in a simple structure and by a simple method. A first contact pattern, a second contact pattern, and a third contact pattern are provided at different positions, respectively. The mode of the camera can be optionally selected out of a derivative mode switch having a first mode setting button which enables conduction of the first contact pattern and the second contact pattern, and a derivative mode switch having a first mode setting button which enables conduction of the first contact pattern and the third contact pattern.

23 Claims, 13 Drawing Sheets

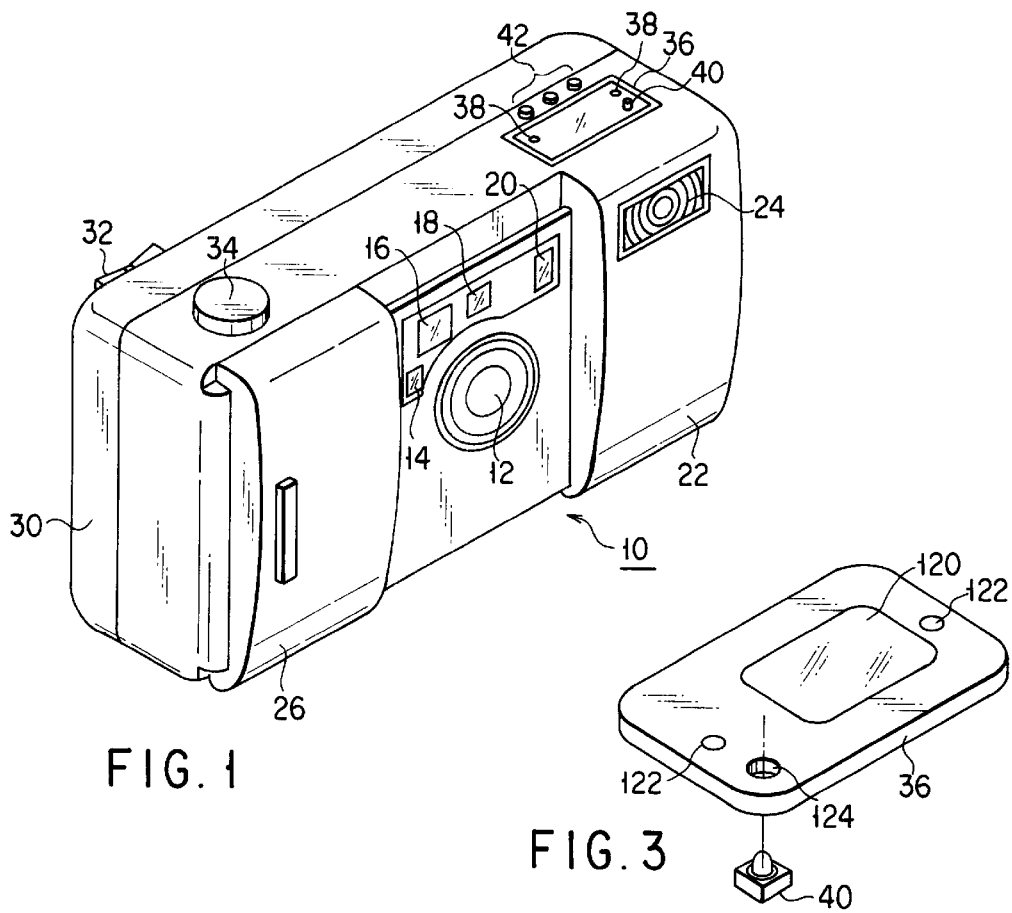
FIG. 1
FIG. 3
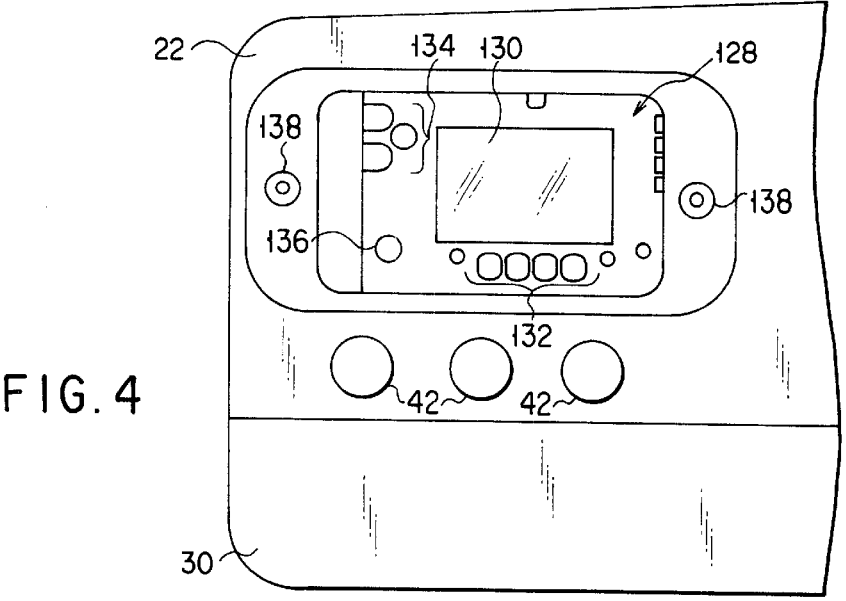
FIG. 4

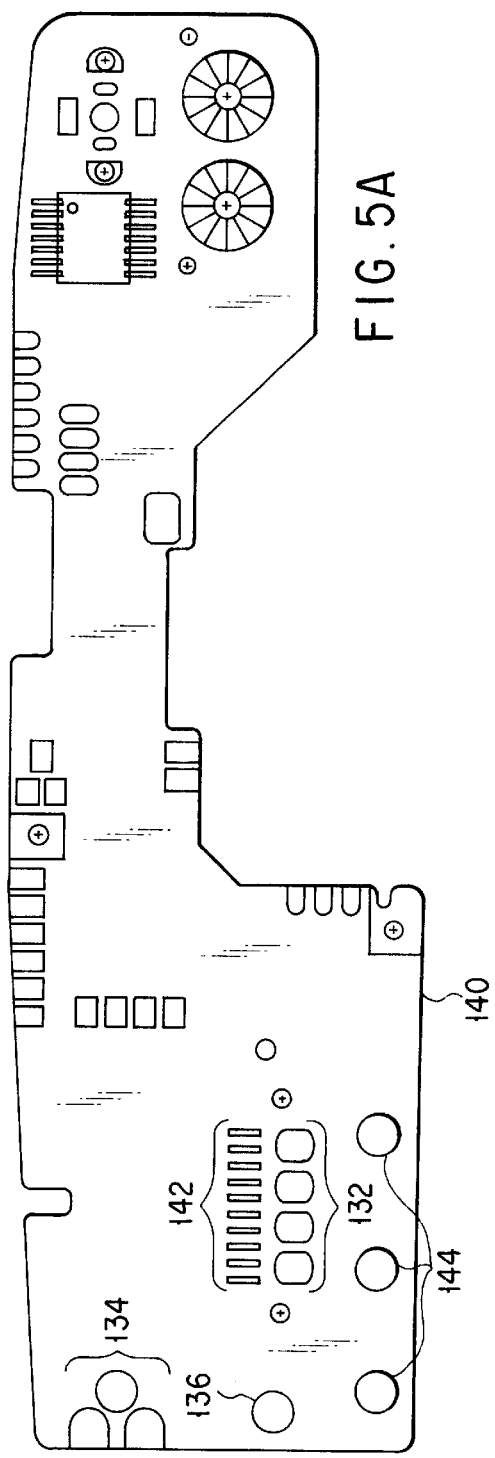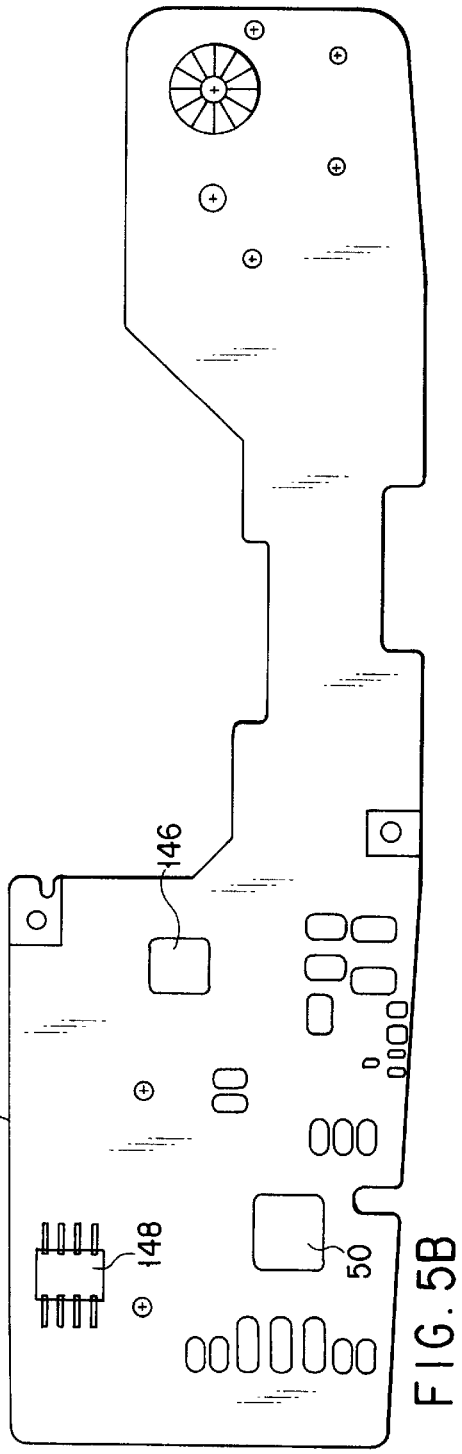

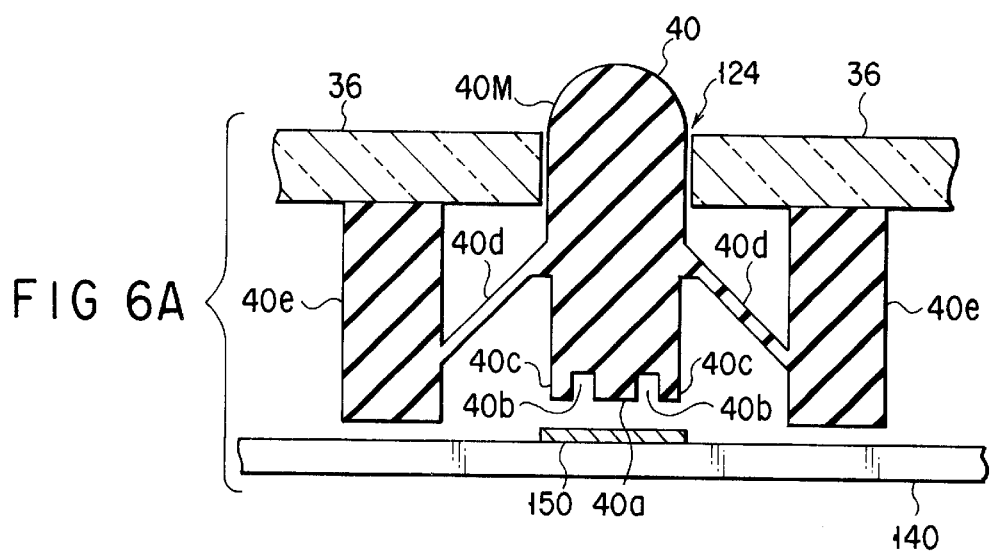
FIG. 6A
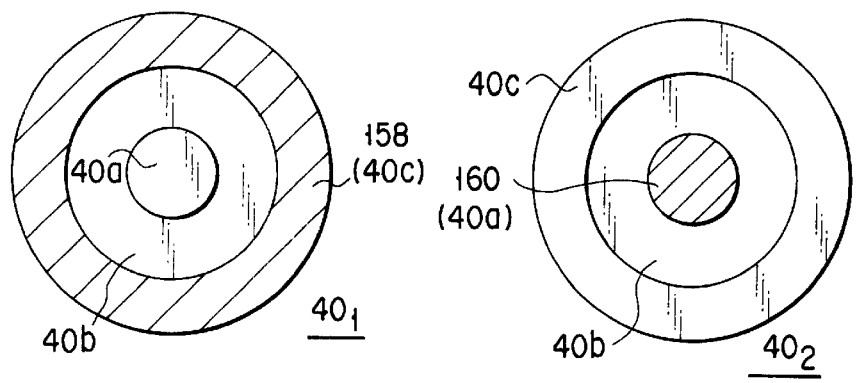
FIG. 6B
FIG. 6C
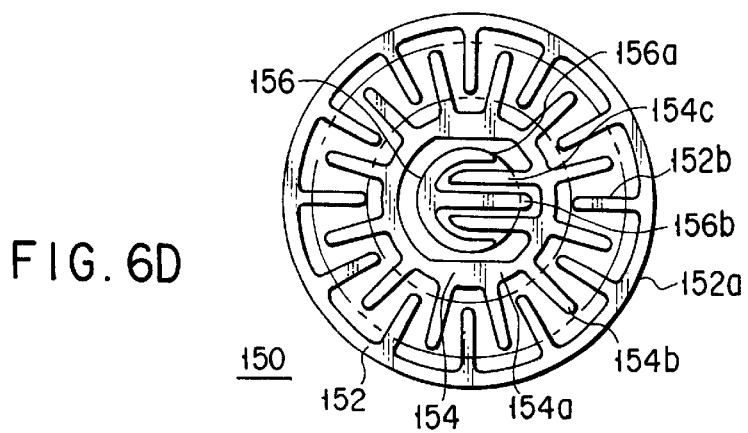
FIG. 6D

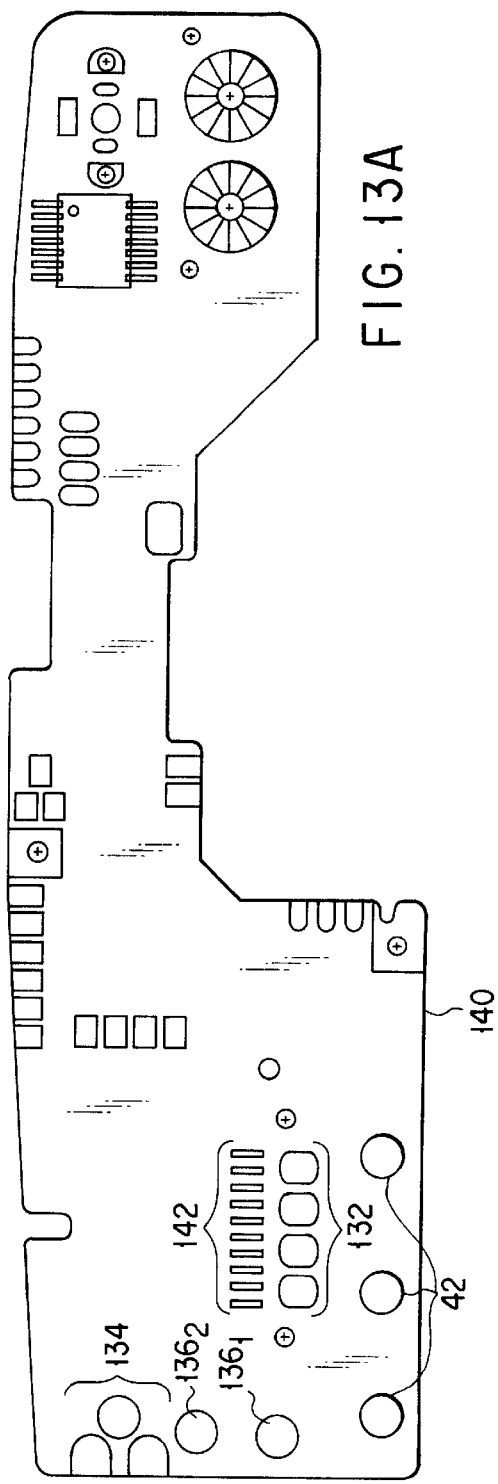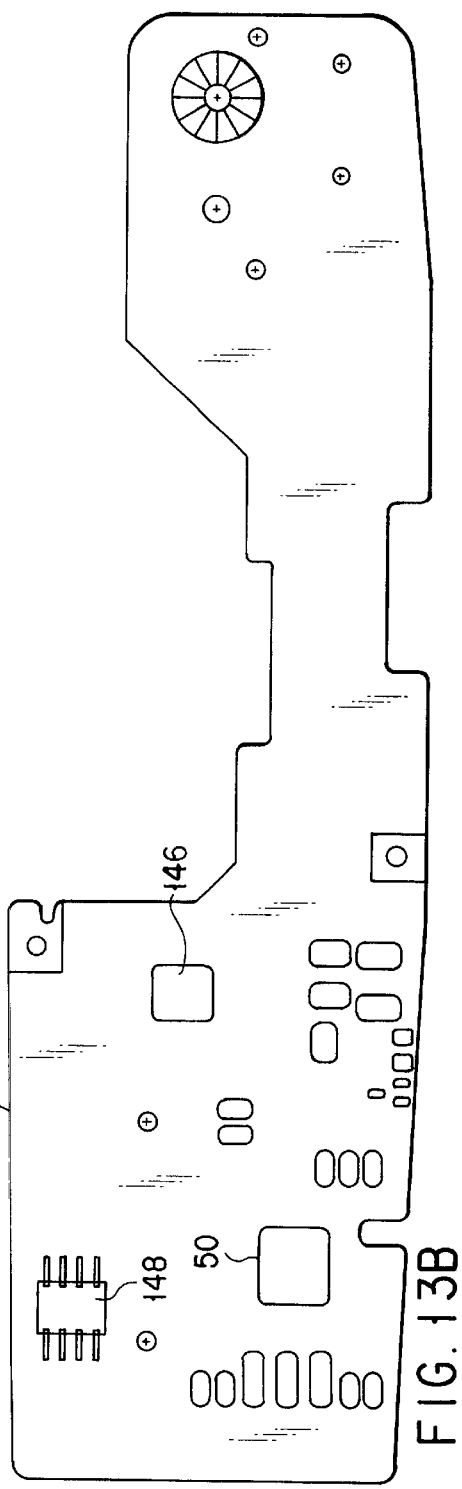

CAMERA ENABLING THE CHANGE IN THE PRODUCT SPECIFICATIONS, AND A METHOD OF MANUFACTURING

CROSS-REFERENCE TO RELATED APPLICATIONS

This application is based upon and claims the benefit of priority from the prior Japanese Patent Applications No. 11-310147, filed Oct. 29, 1999, No. 11-310148, filed Oct. 29, 1999; and No. 11-310149, filed Oct. 29, 1999, the entire contents of which are incorporated herein by reference.

BACKGROUND OF THE INVENTION

The present invention relates to a camera having a plurality of kinds of photography modes, and more particularly to a camera enabling a change in the product specifications by replacing a part thereof.

Electronic cameras in recent years enable the selection of each mode at the time of photography. Then, in cameras which enable the selection of modes, camera products are prevalent which enable photography suitable to scenes to be photographed by the selection of each kind of mode in accordance with the scene to be photographed.

If the number of modes is increased in order to provide more special photographic effects to a plurality of scenes, however, the camera will have more and more functions. Some of the functions may be unnecessary to most users. And if there are too many functions, it may be difficult for most users to operate the camera.

For example, Jpn. Pat. Appln. KOKAI Publication No. 55-84930 and Jpn. Pat. Appln. KOKAI Publication No. 5-150330 propose a technology which enables the selection of whether a data recording function is to be added by users by means of a data recording device detachable from the cameras. However, with a device described in Jpn. Pat. Appln. KOKAI Publication No. 55-84930 and Jpn. Pat. Appln. KOKAI Publication No. 5-150330, the specification selectable by users is only the data recording function. Besides, the operation thereof is very troublesome for users, and is, therefore, not preferable.

Besides, on the other hand, the desire of users is diversified, so that it is difficult to answer to the desire of users with only one product. Thus it has been desired that a product is provided which has a plurality of specifications.

However, the change of the specification of normal products requires the change of parts in the products and a control program. Besides, along with this, it becomes necessary to reconsider the process of manufacturing the products. Therefore, this leads to an increase in the cost thereof, and it has been difficult to instantly answer to the desire of users.

Furthermore, with such cameras, a selected mode can be visually recognized by a liquid crystal display panel or the like so that users can identify which mode is selected in accordance with the state of the selection of the modes in normal cameras. However, when an attempt is made to provide a display corresponding to a plurality of specifications, a large number of display items must be prepared inside of the liquid crystal display panel, which leads to an increase-in the size of the liquid crystal display.

BRIEF SUMMARY OF THE INVENTION

Therefore, an object of the present invention is to provide a camera in which a plurality of specifications can be selected through a simple structure and a simple operation.

Another object of the present invention is to provide a camera which enables an easy display to users without increasing the size of a display element for displaying the state of the camera at the time of enabling the selection of a plurality of specifications and without increasing the cost thereof.

Still another object of the present invention is to provide a camera in which the change in the product specification can be will understood by users without increasing the size of a display element for displaying the state of the camera at the time of enabling the selection of the specifications.

According to a first aspect of the invention, there is provided a camera comprising:

a control circuit which corresponds to a first specification having a predetermined mode, and a second specification having a predetermined mode which is different at least in part from the mode in the first specification;

first switch patterns for changing the mode on the basis of the first specification;

second switch patterns for changing the mode on the basis of the second specification;

an operation member corresponding to either of the first switch patterns and the second switch patterns; and a holding member on which the operation members are attached;

wherein the specification of the camera is changed by alternatively selecting and attaching the operation members.

According to a second aspect of the invention, there is provided a camera comprising:

a first electric contact;

a second electric contact provided at a position different from the position of the first electric contact;

a third electric contact provided at a position different from the positions of the first electric contact and the second electric contact;

a control circuit for selecting a mode of the camera in accordance with the conduction state between the first electric contact and the second electric contact, or the conduction state between the second electric contact and the third electric contact; and an attachment for holding either a first operation member which allows the first electric contact and the second electric contact to be electrically connectable, or a second operation member which allows the second electric contact and the third electric contact to be electrically connectable, wherein the first and second operation members change the specification of the camera when held by the attachment.

According to a third aspect of the invention, there is provided a camera comprising:

a first switch constituted of a pair of electric contacts for selecting a mode of the camera;

a second switch provided at a position different from the position of the first switch and constituted of a pair of electric contacts for selecting the mode of the camera; and an attachment portion on which either a first holding member corresponding to the first operation member is attached which enables to operate the first switch or a second holding member corresponding to the second operation member is attached which enables to operate the second switch;

wherein the specification of the camera is changed by selecting and attaching the first holding member and the second holding member.

According to a fourth aspect of the invention, there is provided a camera comprising:

a first switch corresponding to a first operation member for selecting a mode of the camera;

a second switch arranged at a position different from the position of the first switch and corresponding to a second operation member for selecting the mode of the camera;

wherein the specification of the camera is changed by optionally selecting and attaching the first operation member and the second operation member.

According to a fifth aspect of the invention, there is provided a camera comprising:

a control circuit which corresponds to a first specification having a predetermined mode, and a second specification having a predetermined mode which is different at least in part from the mode in the first specification;

a first switch corresponding to the first specification;

a second switch corresponding to the second specification;

an attachment portion on which a first operation member is arranged to operate the first switch when the first specification is selected, or a second operation member is arranged to operate the second switch when the second specification is selected;

wherein the control circuit changes over a mode of the camera on the basis of the first specification in accordance with an input of the first switch and changes over the mode on the basis of the second specification in accordance with an input of the second switch.

According to a sixth aspect of the invention, there is provided a camera comprising:

a control circuit which corresponds to the first specification having a predetermined mode of the camera, and to the second specification having a predetermined mode a part of which is different from the first specification;

an attachment portion on which either the first operation member attached on the camera is attached when the first specification is selected, or a second operation member attached on the camera is attached when the second specification is selected;

a first switch corresponding to the first specification; and a second switch corresponding to the second specification;

wherein the first specification and the second specification are selected by selecting the first operation member and the second operation member, and the control circuit changes over the mode of the camera on the basis of the first specification in accordance with the input of the first switch and changes over the mode of the camera on the basis of the second specification in accordance with the input of the second switch.

According to a seventh aspect of the invention, there is provided a method for manufacturing a camera comprising the steps of:

manufacturing an assemblage of parts which corresponds to the camera of the first specification and the camera of the second specification, the assemblage corresponding to the camera of the first and the camera of the second specification and including:

a first switch for selecting a mode on the basis of the first specification in the camera of the first specification, a second switch for selecting a mode on the basis of the second specification in the camera of the second specification, and a control circuit for selecting the mode in accordance with the output of the a first switch and the second switch; and selecting one of the camera of the first specification and the camera of the second specification;

wherein the method for manufacturing the camera of the first specification comprises the step of attaching an operation member for operating the first switch, and the method for manufacturing the camera of the second specification comprises the step of attaching an operation member for operating the second switch.

According to an eighth aspect of the invention, there is provided a method for manufacturing a camera comprising the steps of:

manufacturing a first specification camera, which includes the step of attaching an operation member for operating the first switch which selects the first mode on the basis of the first specification; and manufacturing a second specification camera, which includes the steps of:

attaching an operation member for operating operate the second switch to select the second mode on the basis of the camera of the second specification; and assembling parts for the camera of the specification selected.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing an external appearance of a camera according to a first embodiment of the present invention;

FIG. 3 is a view showing an LCD window 36 and the first mode seeing button 40 of FIG. 1.

FIG. 4 is a view showing the camera as seen from the top portion of the camera in the state in which the LCD window 36 is detached from the front cover 22;

FIGS. 5A and 5B are views showing a main substrate on which the LCD window 130 or the like is mounted, FIG. 5A is a view showing a surface side thereof while FIG. 5B is a view showing a rear side thereof;

FIGS. 6A through 6D are views for explaining a structure of a first mode setting button 40 and a derivative mode switch of the camera according to the first embodiment of the present invention; FIG. 6A is a sectional view showing a state in which the first mode setting button 40 is attached on the LCD window 36; FIG. 6B is a view showing a first example of a bottom portion of the first mode setting button 40; FIG. 6C is a view showing a second example of the bottom portion of the first mode setting button 40; and FIG. 6D is a view showing an example of a land pattern corresponding to the first mode setting switch 40;

FIG. 8A is a view showing an example of an LCD window $36_1$ on which the first mode setting button $40_1$ is provided which is the first specification, FIG. 8B is a view showing an example of the LCD window $36_2$ on which the first mode setting button $40_2$ is attached which is the second specification;

FIGS. 13A and 13B are views showing the main substrate on which the LCD 130 or the like according to the second embodiment of the present invention is mounted; FIG. 13A is a view showing a surface side thereof, and FIG. 13B is a view showing a rear surface side thereof;

FIG. 14A is a sectional view showing a state in which the first mode setting button 40 is mounted on the LCD window 36, FIG. 14B is a view showing an example of the land pattern corresponding to the first mode setting button 40; FIG. 15A is a view showing an example of the LCD window $36_1$ on which the first mode setting switch $40_1$ is attached which is the first specification, FIG. 15B is a view showing an example of the LCD window $36_2$ on which the first mode setting switch $40_2$ is attached which is the second specification.

DETAILED DESCRIPTION OF THE INVENTION

Figure 2:
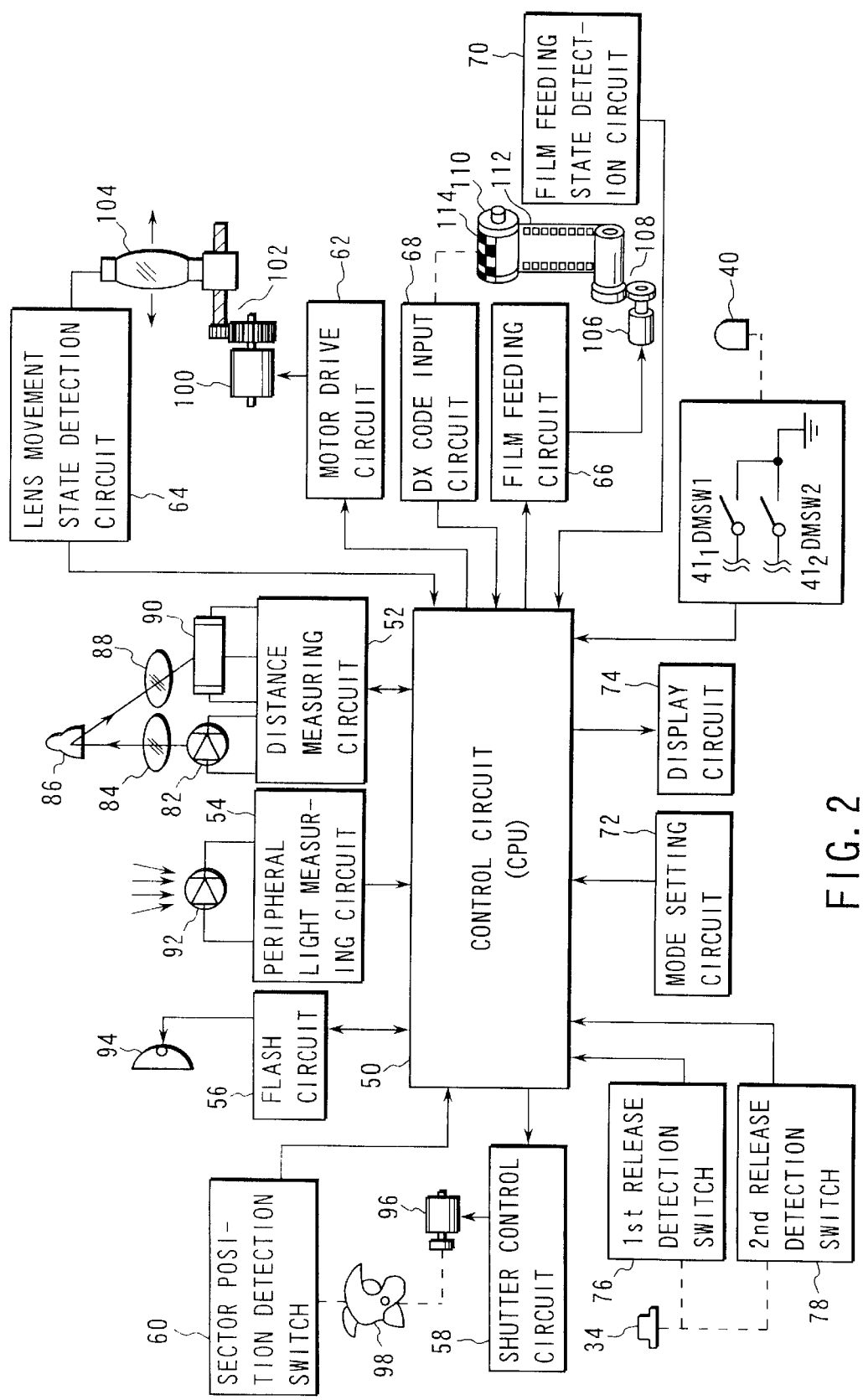
FIG. 2 is a block diagram showing an electric structure of the camera according to the first embodiment of he present invention.

Embodiments of the present invention will be explained hereinbelow by referring to the drawings.

FIG. 1 is a perspective view showing an external appearance of a camera according to a first embodiment of the present invention.

In FIG. 1, approximately in the center of a front surface portions of a main body 10 of the camera, a photographing lens barrel 12 is provided which has a photography lens. In FIG. 1, above the photographing lens barrel 12, a finder object window 14, an infrared ray light projection window 16 and a light receiving window 20 for the known active style triangulation, and a light measuring window 18 for the light-measuring are arranged respectively.

Furthermore, a front cover 22 is attached on the front surface portion of the main body 10 of the camera. A rear cover 30, which will be described later, is attached on the front cover 22, so that the cover 22 and 30 define the outer surface of the main body 10 of the camera.

On the front surface portion of the front cover 22, and on the right side portion in FIG. 1, a flash light emitting window 24 for flash light emission is provided. Furthermore, on the front surface portion of the front cover 22, a barrier 26 is slidably provided which also serves as a power switch for turning on and off the power source of the camera. The photographing lens barrel 12 is extended after the barrier 26 is moved to the on position as shown in FIG. 1, and the photographing lens barrel 12 is withdrawn when the barrier 26 is moved to an off position from the on position as shown in FIG. 1.

On the rear surface of the camera main body 10, the rear cover 30 constituting the external appearance of the camera together with the front cover 22 as described above is mounted. On the rear cover 30, a zoom lever 32 is provided for varying a focal length of the photographing lens both in the tele direction and in the wide direction.

In FIG. 1, on the left side of the top surface portion of the front cover 22, a release button 34 of a two-step switch is provided which is constituted of a first release detection switch and a second release detection switch which will be described later. Furthermore, on the right side of the top surface portion of the front cover 22, an LCD window 36 for protecting a LCD which is a display element described later is fixed with screws 38 and 38. Furthermore, on the LCD window 36, a first mode setting button 40 is provided. Then, in the vicinity of the LCD window 36, a second mode setting buttons 42 are arranged for setting the date and the mode.

FIG. 2 is a block diagram showing a structure of an electric structure of the camera according to the first embodiment of the invention.

A control circuit 50 comprises a CPU, which commands the control operation of the whole camera. To the CPU 50, the first mode setting button 40, a distance measuring circuit 52, a peripheral light measuring circuit 54, a flash circuit 56, a shutter control circuit 58, a sector position detection switch 60, a motor driving circuit 62, a lens movement state detection circuit 64, a film feeding circuit 66, a DX code input circuit 68, a film feeding state detection circuit 70, a mode setting circuit 72, a display circuit 74, the first (1st) release detection switch 76 and the second (2st) release detection switch 78 are connected.

The first mode setting button 40 is constituted in such a manner that either a derivative mode switch (DMSW1) $41_1$ or a derivative mode switch (DMSW2) $41_2$ can be operated. The structure of this first mode setting button 40 will be described later.

To the distance measuring circuit 52, an infrared ray light-emitting diode (IRED) 82 and a light-receiving element (for example, PSD) 90 are connected. Light from the infrared light-emitting diode 82 is applied to a subject 86 to be photographed via a light projection lens 84, so that the reflection light from the subject 86 to be photographed is received at the PSD 90 via a light-receiving lens 88, so that the distance from the camera to the subject is measured.

The peripheral light measuring circuit 54 corresponds to the light measuring circuit, so that the luminance of the subject for determining the exposure condition is measured. To the peripheral light measuring circuit 54, a light-measuring sensor 92 is connected which is constituted, for example, of a CDS and an amorphous silicon photodiode.

Furthermore, the flash circuit 56 is a circuit for allowing the flash 94 to emit light, and controls the quantity of light emission of the flash 94 with the control from the CPU 50.

To the shutter control circuit 58, a motor 96 for the shutter control is connected. On the basis of the exposure information from the peripheral light measuring circuit 54, the shutter control circuit 58 drives the motor 96 so that the opening and closing operation of a sector 98 is conducted. Then, the state of the sector 98 is detected with the sector position detection switch 60, and is fed back to the CPU 50 to be controlled.

The motor driving circuit 62 drives a motor 100 with the control from the CPU 50. The rotation force that is driven here is transmitted to the photographing optical system 104 via a gear row 102. Then, the movement quantity of the photographing optical system 104 is detected with the lens movement state detection circuit 64, so that the movement quantity is fed back to the CPU 50. Then, the motor driving circuit 62 is controlled, so that the photographing optical system 104 is moved to an appropriate position.

The film feeding circuit 66 drives a film feeding motor 106. The film feeding motor 106 is driven with the control of the CPU 50 via the film feeding circuit 66, so that a film 112 wound in a film cartridge 110 is fed. With this, the film 112 is wound up and rewound.

Furthermore, a perforation formed on the film 112 is detected with the film feeding state detection circuit 70, so that the state of the film 112 is detected.

Furthermore, the DX code input circuit 68 reads information of the DX code 114 printed on the film cartridge 110. The DX code 114 is sent to the CPU 50 from the DX code input circuit 68, so that ISO sensitivity information, the number of frames or the like of the film 112 within the film cartridge 110 can be obtained.

The mode setting circuit 72 is a circuit for setting each kind of photography mode such as a remote control mode, a self-timer mode, a flash light emission mode or the like. Each kind of photography mode set by this mode setting circuit 72 and the like is not shown in FIG. 2, but is selected and determined by the second mode setting button 42.

Furthermore, the display circuit 74 comprises a liquid crystal element such as a LCD or the like, and the date information, the number of photographed frames of the film and each kind of mode set by the mode setting circuit 72 are displayed.

The first (1st) release detection switch 76 and the second (2st) release detection switch 78 are a two-step switch as described above, and the two-step switch constitutes a release button 34. When the first release detection switch 76 is turned on, the distance measuring operation and the light measuring operation which accompany the photographing operation are conducted. Then, when the second release detection switch 78 is turned on, a focus adjustment operation and an opening and closing operation of the. shutter are conducted.

FIG. 3 is a view showing the LCD window 36 described above and the first mode setting button 40.

In FIG. 3, the LCD window 36 is provided for protecting the surface of the LCD described later. In the central portion thereof, there is a transparent display portion 120, so that the display of the LCD can be visually recognized. Then, the peripheral part of the display portion 120 is formed in opaque color, for example, black color.

Furthermore, in the vicinity of the both end portions of the LCD window 36, holes 122 and 122 are formed for fixing the LCD window 36 on the front cover 22 of the camera with the screws 38 and 38 described above. Furthermore, in order to attach the first mode setting button 40, a hole 124 into which the first mode setting button 40 can be inserted is formed in the LCD window 36. After the first mode setting button 40 is inserted into the hole 124, the first mode setting button 40 is fixed to the rear surface of the LCD window 36 with a bonding agent or the like. Incidentally, the details of this structure will be described later.

FIG. 4 is a view showing the camera as seen from the top surface thereof in the state in which the LCD window 36 is detached from the front cover 22.

On the upper surface portion of the front cover 22 and on a-portion corresponding to the LCD window 36 described above, an opening 128 is formed. Then, on a position corresponding to the display portion 120 of the LCD window 36, an LCD 130 is arranged which serves as a display element. On the periphery of the LCD 130, a plurality of check lands 132 and 134 for adjustment and a land 136 or the like for the first mode setting button 40 are arranged. Besides, in the vicinity of the both end portions of the opening 128, bosses 138 and 138 screwed with screws 38 and 38 are provided.

The plurality of check lands 132 and 134 are exposed at the step prior to the attachment of the LCD window 36. Consequently, adjusters can conduct an electric adjustment such as reading and writing of adjustment values in the camera by enabling the CPU 50 and adjustment devices not shown to conduct communication via these check lands 132 and 134.

FIGS. 5A and 5B show a main substrate on which the LCD 130 or the like is mounted. FIG. 5A is a view showing a surface side thereof and FIG. 5B is a view showing a rear surface side thereof.

As shown in FIG. 5A, on the surface side of the main substrate 140, land 142 for connection with the LCD 130 not shown in FIGS. 5A and 5B is provided in the vicinity of the check land 132. Furthermore, in the vicinity-of the end portion of the main substrate 140, an operation button land 136 corresponding to the first mode setting button 40 and an operation button land 144 corresponding to the second mode setting button 42 are provided ;respectively.

Furthermore, the CPU 50, an IFIC 146 and an EEPROM 148 or the like are mounted on the rear surface side of the main substrate 140 shown in FIG. 5B.

Here, the structures of the first mode setting button 40 and the derivative mode switch will be explained by referring to FIGS. 6A through 6D.

FIG. 6A is a sectional view showing a state in which the first mode setting button 40 is attached on the LCD window 36. FIG. 6B is a view showing a first example of the bottom portion of the first mode setting button 40. FIG. 6C is a view showing a second example of the bottom portion of the first mode setting button 40. FIG. 6D is a view showing an example of the land pattern of the land 136 for the first mode setting button corresponding to the first mode setting button 40.

In the first mode setting button 40, a circular contact portion 40a and a ring-like contact portion 40c with a groove portion 40b formed in a predetermined interval from the contact portion 40a are formed at the bottom portion of the main portion 40M. A base portion 40e is allowed to adhere to the rear surface of the LCD window 36 via a bellow 40d formed of an elastic material such as a rubber or the like extending to the periphery of the main portion 40M. As a consequence, the first mode setting button 40 can be moved freely in a vertical direction along the hole 124.

On the other hand, on the land 136 for the first mode setting button, the land being formed on the main substrate 140, a land pattern 150 having a configuration shown in FIG. 6D is provided.

The land pattern 150 comprises a first contact pattern 152 constituting the respectively independent first electric contact, the second electric contact and the third electric contact, a second contact pattern 154, and a third contact pattern 156.

The first contact pattern 152 is constituted with a first pattern 152a formed in a ring-like configuration, and a plurality of second patterns 152b extending in a predetermined length toward the central portion in a predetermined interval from the first pattern 152a.

Furthermore, the second contact pattern 154 has a ring-like first pattern 154a which, is concentric with the first pattern 152a of the first contact pattern 152. The second contact pattern 154 also has plurality of second patterns 154b which radially extend toward the outside in a predetermined length from the first pattern 154a, and a plurality of third patterns 154c which extend toward the inside in a predetermined length from the first pattern 154a. The plurality of second patterns 154b are provided respectively in predetermined intervals in a circumferential direction, and the plurality of third patterns 154c are provided respectively in predetermined intervals in a circumferential direction.

Furthermore, the third contact pattern 156 comprises an arc-like first pattern 156a having a concentric configuration with the first pattern 152a of the first contact pattern 152 and the first pattern 154a of the second contact pattern 154 and having a diameter smaller than the first patterns 152a and 154a, and a second pattern 156b formed in a comb-tooth like configuration in a predetermined interval from the third pattern 154c of the second contact pattern 154. Incidentally, the third pattern 154c of the second contact pattern 154 and the first and the second patterns 156a and 156b of the third contact pattern 156 are alternately arranged, so that the first and second pattern 156a and 156b do not come into contact with the third pattern 154c.

As described above, the first mode setting button 40 is constituted in such a manner that either a derivative mode switch (DMSW1) $41_1$ or a derivative mode switch (DMSW2) $41_2$ can be operated. Then, the land pattern 150 which is constituted as described above has three kinds of the first, the second and the third contact patterns 152, 154 and 156. The above DMSW1 and the above DMSW2 are constituted with this combination. That is, the above DMSW1 is turned on by allowing the first contact pattern 152 and the second contact pattern 154 to conduct electricity, and the above DMSW2 is turned on by allowing the second contact pattern 154 and the third contact pattern 156 to conduct electricity.

Then, the surface of the ring-like contact portion 40c of the first mode setting button 40 is constituted as a conductive portion 158 by conductive printing processing, for example, as shown in FIG. 6B, in such a manner that either the above DMSW1 or the above DMSW2 can be operated. When the first mode setting button 40$_1$ is pressed and operated, the above conductive portion 158 comes into contact with the land pattern 150 provided under the first mode setting button $40_1$. In more detail, the second pattern 152b incorporated in the first contact pattern 152 of the land pattern 150 and the second pattern 154b incorporated in the second contact pattern 154 are allowed to conduct electricity via the conductive portion 158 with the result that the DMSW1 is turned on. Consequently, in this case, the DMSW1 can be operated so that the first specification camera can be obtained by setting the first mode setting button $40_1$.

On the other hand, as shown in FIG. 6C, the surface of the circular contact portion 40a is constituted as a conductive portion 160 by the conductive printing processing or the like. The conductive portion 160 comes into contact with the land pattern 150 provided under the first mode setting button $40_2$ by pressing and operating the first mode setting button $40_2$ which is constituted in this manner. In more detail, the third pattern 154c incorporated in the second contact pattern 154 of the land pattern 150 and the third contact pattern 156 are allowed to conduct electricity via the conductive portion 160 with the result that the DMSW2 is turned on. Consequently, in this case, the DMSW2 can be operated and a second specification camera can be obtained by setting the first mode setting button $40_2$.

In this manner, two different specifications can be easily changed over by providing the conductive portion by the first mode setting button 40 having approximately the same configuration on the first land pattern 150 having three kinds of contacts.

The number of contact patterns can be decreased by using one out of three kinds of contact patterns along with the switch (the DMSW1) used at the time of the first specification and the switch (the DMSW2) used at the time of the second specification.

Incidentally, according to the embodiment, in the case where the first mode setting button 40 is simply denoted, the embodiment corresponds either to the first mode setting button $40_1$ of the first specification or to the first mode setting button $40_2$ of the second specification.

Figure 7:
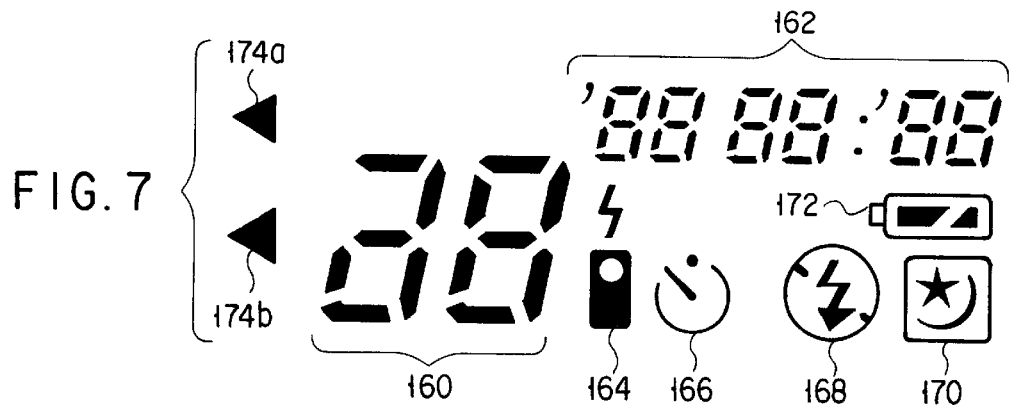
FIG. 7 is a view showing an example of a display mark displayed on the LCD 130.

FIG. 7 is a view showing an example of a display marks displayed on the LCD 130.

On the LCD 130, a mark 160 representing the number of frames of the charged film, a mark 162 representing the date information, a mark 164 representing a remote control mode, a mark 166 representing a self-timer mode, a mark 168 representing a flash photography mode, a mark 170 representing a night scene mode, a mark 172 representing a residual quantity of a battery, and marks 174a and 174b for setting the mode selected by the first mode setting button 40 are displayed.

Figure 8A:
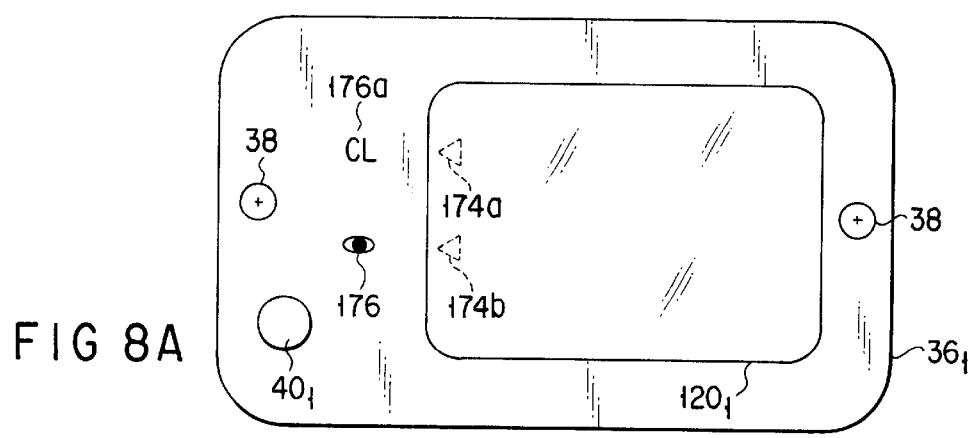
FIGS. 8A and 8B are views showing an LCD window on which different first mode setting buttons are attached.
Figure 8B:
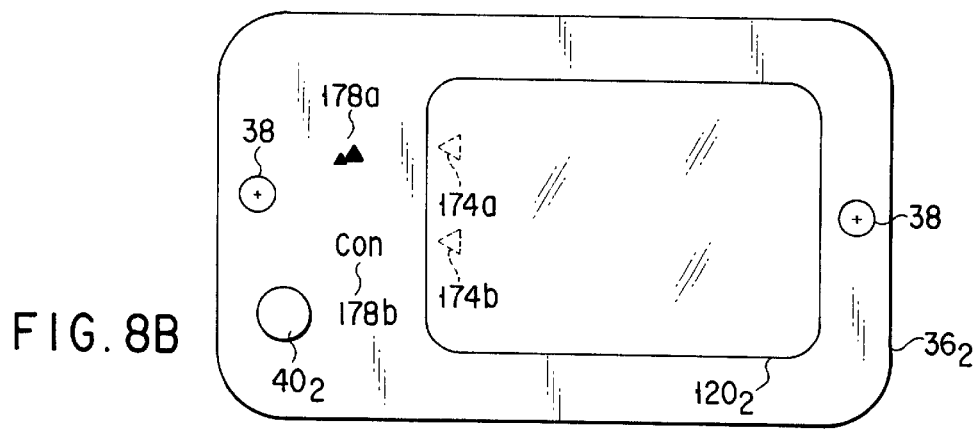

FIGS. 8A and 8B are views showing an example of an LCD window $36_1$ on which the different first mode setting buttons described above are provided which are the first specifications.

FIG. 8A shows an example of the LCD window $36_1$ on which the first mode setting mode $40_1$ is attached which is the first specification.

In this case, as the first specification, a mark 176a representing a catch light mode (CL) and a mark 176b representing a red eye alleviation mode are displayed on the LCD window $36_1$ by means of printing or the like. Then, in accordance with the operation state of the derivative mode switch $41_1$, the marks 174a and 174b of the LCD 130 located at the side of the display portion $120_1$ are selectively displayed.

That is, in the case where the catch light mode is selected the mark 174a corresponding to the mark 176a is displayed. In the case where the red eye alleviation mode is selected, the mark 174b corresponding to the mark 176b is displayed. Furthermore, in this case, every time the derivative mode switch $41_1$ is turned on, a cycle of the catch light mode, the red eye alleviation mode, no selection of the modes, and the catch light mode is repeated.

Incidentally, when neither the catch light mode nor the red eye alleviation mode is selected, neither the mark 174a nor the mark 174b is displayed.

In a similar manner, FIG. 8B shows an example of the LCD window $36_2$ on which the first mode setting button $40_2$ is provided which is the second specification.

In this case, as the second specification, the mark 178a representing an infinite mode for a far sight photography and the mark 178b representing a continuous photography mode are displayed by printing or the like on the LCD window $36_2$. Then, in accordance with the operation state of the derivative mode switch $41_2$, the marks 174a and 174b located at the side of the display $120_2$ are alternatively displayed.

In other words, in the case where the infinite mode is selected, the mark 174a corresponding to the mark 178a is displayed. In the case of the continuous photography mode is selected, the mark 174b corresponding to the mark 178b is displayed. Furthermore, in this case, every time the derivative mode switch $41_2$ is turned on, the cycle of the infinite mode, the continuous photography mode, no selection of the modes, the infinite mode and the like is repeated.

Incidentally, in the case where neither the infinite mode nor the continuous photography mode is selected, neither the mark 174a nor the mark 174b is displayed.

Figure 9A:
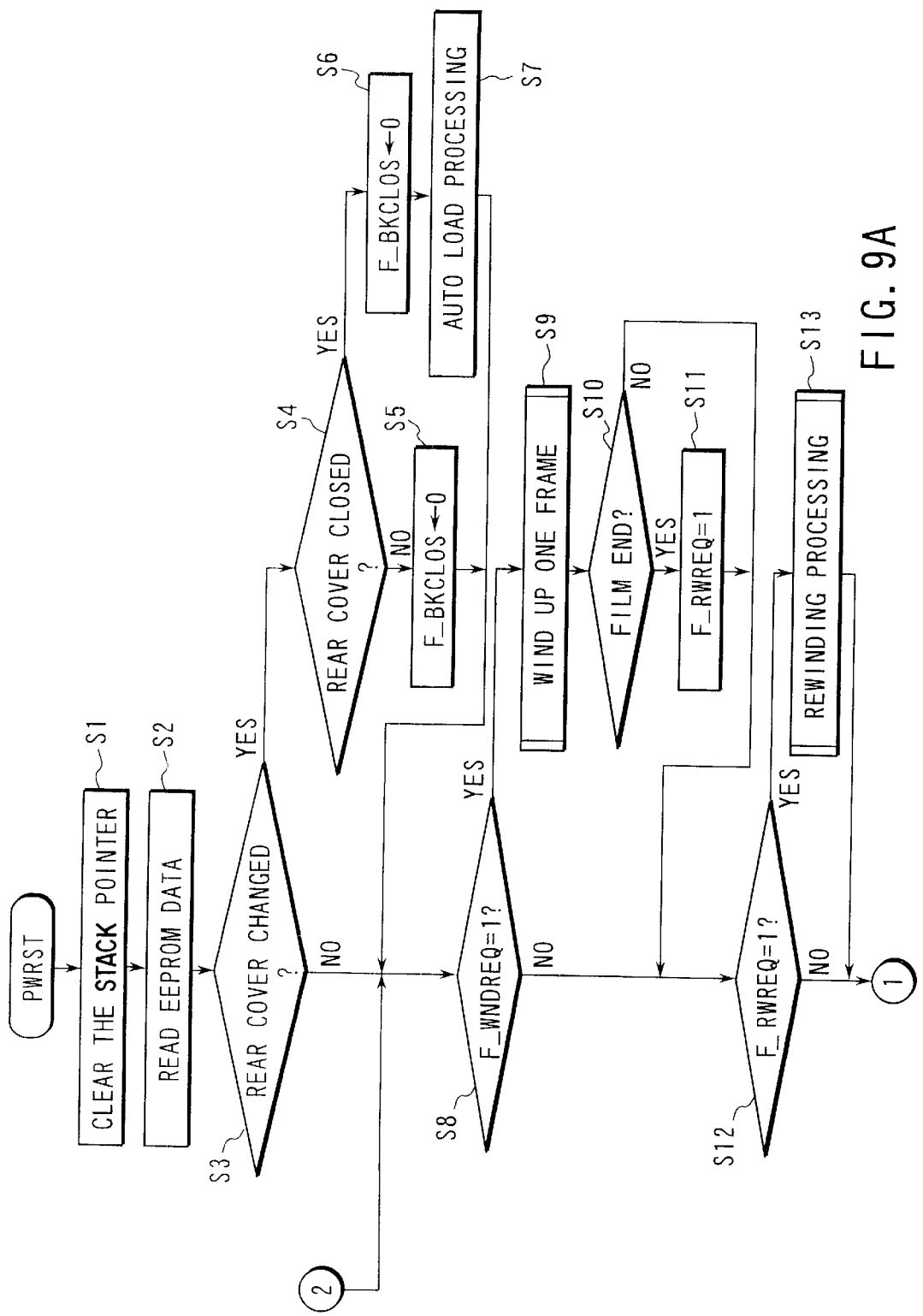
FIGS. 9A and 9B are flowcharts for explaining an operation of the camera according to the first embodiment of the present invention.

Next, an operation of the camera according to the embodiment of the present invention will be explained by referring to the flowcharts of FIGS. 9A and 9B.

An interruption is generated by the change in the power switch which is turned on and off with the opening and closing the of the barrier 26 or in accordance with the change state of the rear lid switch which is turned on and off by closing and opening the rear lid supported by the rear cover 30. Thus, this routine (PWRST) is started.

In the beginning, at step S1, the stack pointer is cleared, so that the stack level is initialized. Next, at step S2, adjustment data required for the control of the camera and data representing the state of the camera is read to be deployed on the RAM not shown.

Then, at step S3, the state of the switch (not shown) provided on the rear cover 30 for opening and closing the rear lid for charging the film cartridge is read. Here, the CPU 50 proceeds to step S4 when the open and close switch of the rear cover is changed. In the case where the open and close switch is not changed, the CPU 50 proceeds to step S8.

At step S4, in the case where the rear cover is in the open state with the opening and closing switch of the rear lid, the CPU 50 proceeds to step S5, so that a flag F_BKCLOS representing the state of the rear lid is set to "0" to proceed to step S8. This flag F_BKCLOS is a flag which is set to "0" when the rear lid is in the open state and which is set to "1" when the rear lid is closed state.

On the other hand, when the rear lid is in the closed state at step S4, the CPU 50 proceeds to step S6 to set the flag F_BKCLOS to "1". Next, at step S7, an auto-load processing is conducted.

At step S8, judgment is made whether or not the flag F_WINDREQ representing the request for the winding up of the film is set to "1". When the flag F_WINDREQ is set to "0", the CPU 50 proceeds to step S12.

On the other hand, in the case where the flag F_WINDREQ is set to "1", the CPU 50 proceeds to step S9, so that the sub-routine of winding up of the film for one frame is conducted. Then, after the film is wound up for one frame portion, the flag F_WINDREQ is set to "0", so that the CPU 50 proceeds to step S10.

At step S10, judgment is made whether or not the film has been wound up to the final frame (film end). When the film is not wound up to the final frame, the CPU 50 proceeds to step S12. When the film is wound up to the final frame, the CPU 50 proceeds to step S11, so that the flag F_RWREQ is set to "1" followed by proceeding to step S12.

At step S12, judgment is made whether or not the flag F_RWREQ is set to "1". Here, if the flag F_RWREQ is not set to "1", the CPU 50 proceeds to step S14. When the flag the flag F_RWREQ is set to "1", the CPU 50 proceeds to step S13. At step S13, the sub-routine for rewinding the film is executed. After completion of the rewinding of the film, the flag F_RWREQ is set to "0", so that the CPU 50 proceeds to step S14.

At step S14, the state of the power switch of the camera is confirmed. When the power switch is turned on, the CPU 50 proceeds to step S15. When the power switch is turned off, this routine is completed.

At step S15, the stack pointer is cleared, so that the stack level is initialized. Next, at step S16, the state of each kind of switch of the camera is read.

Then, at step S17, judgment is made whether or not the state of the power switch of the camera has been changed. In the case where the state of the power switch has been changed, the CPU 50 proceeds to the power on reset (PWRST). Besides, in the case where the state of the power switch has not been changed, the CPU 50 proceeds to step S18.

At step S18, judgment is made whether or not the open and close state of the rear lid has been changed. Here, in the case where the open and close state of the rear lid has been changed, the CPU 50 proceeds to PWRST. In the case where the open and close state of the rear lid has not been changed, the CPU 50 proceeds to step S19.

At step S19, judgment is made whether or not a rewind switch which serves as a switch for rewinding the film has been changed. Here, when the rewind switch has not been changed, the CPU 50 proceeds to step S23. When the rewind switch has been changed, the CPU 50 proceeds to step S20.

At step S20, judgment is made whether or not the rewind switch is turned on. When the rewind switch is turned off, the CPU 50 proceeds to step 23. When the rewind switch is turned on, the CPU 50 proceeds to step S21.

At step S21, judgment is made whether or not the flag F_BKCLOS is set to "1". Here, when the flag F_BKCLOS is not set to "1", the CPU proceeds to step S23. When the F_BKCLOS is set to "1", the CPU 50 proceeds to step S22. At step S22, after the flag F_RWREQ is set to "1", the CPU 50 proceeds to PWRST.

At step S23, the sub-routine of the mode change processing is conducted. When this sub-routine is completed, the CPU 50 proceeds to step S24. At step S24, judgment is made whether or not the release request described later is made. Here, when the release request is made, the CPU 50 proceeds to step S25, so that the sub-routine of the release processing which is a photographing operation is conducted. Then, after the sub-routine is completed, the CPU 50 proceeds to step S8. Then, at step S24, when the release request is not made, the CPU 50 proceeds to step S15.

Figure 10:
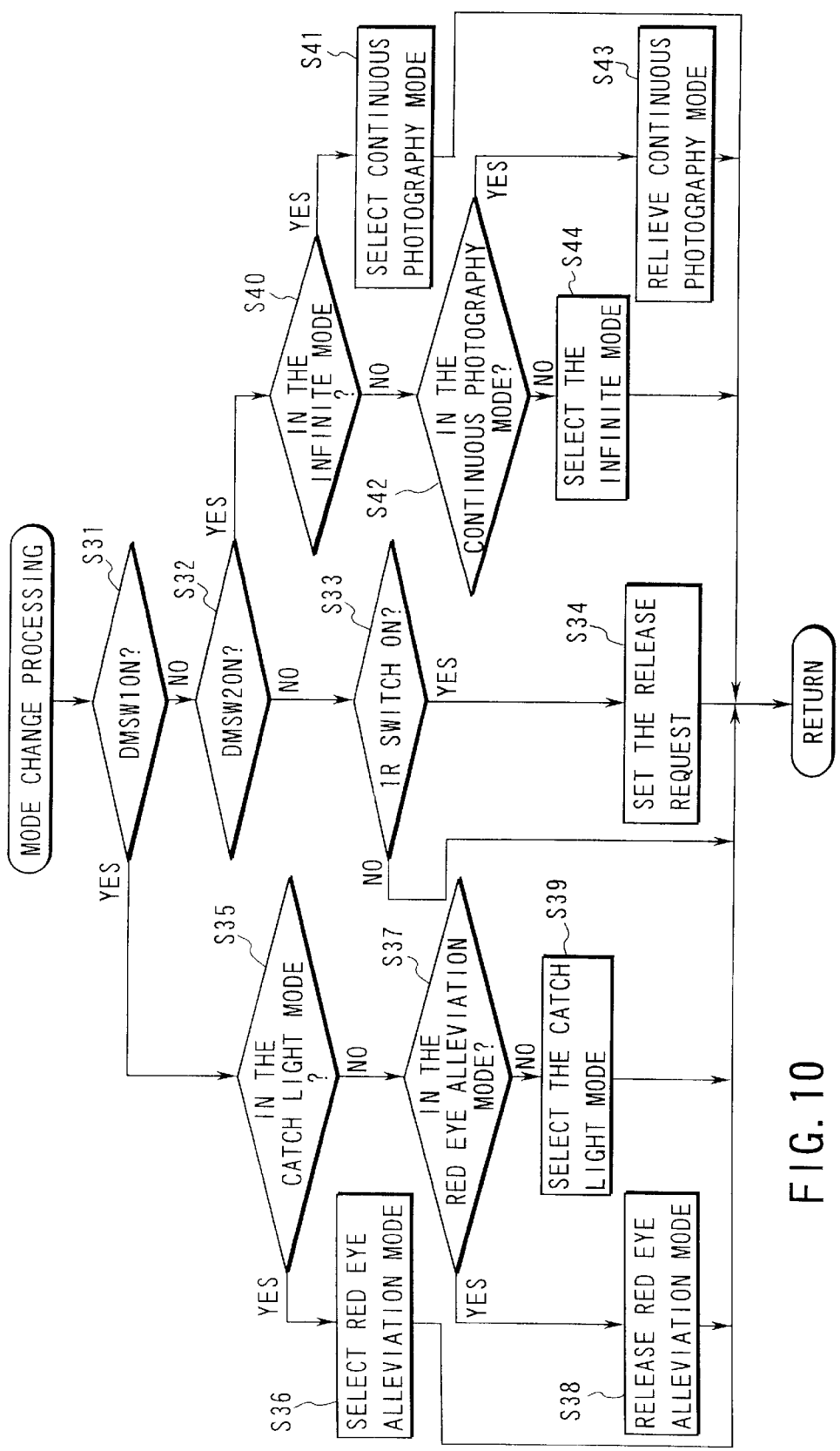
FIG. 10 is a flowchart for explaining an operation of the sub-routine "mode change processing" at step S23 of the flowchart of FIG. 9B.

Next, an operation of the sub-routine of the "mode change processing" will be explained by referring to the flowchart of FIG. 10.

Figure 9B:
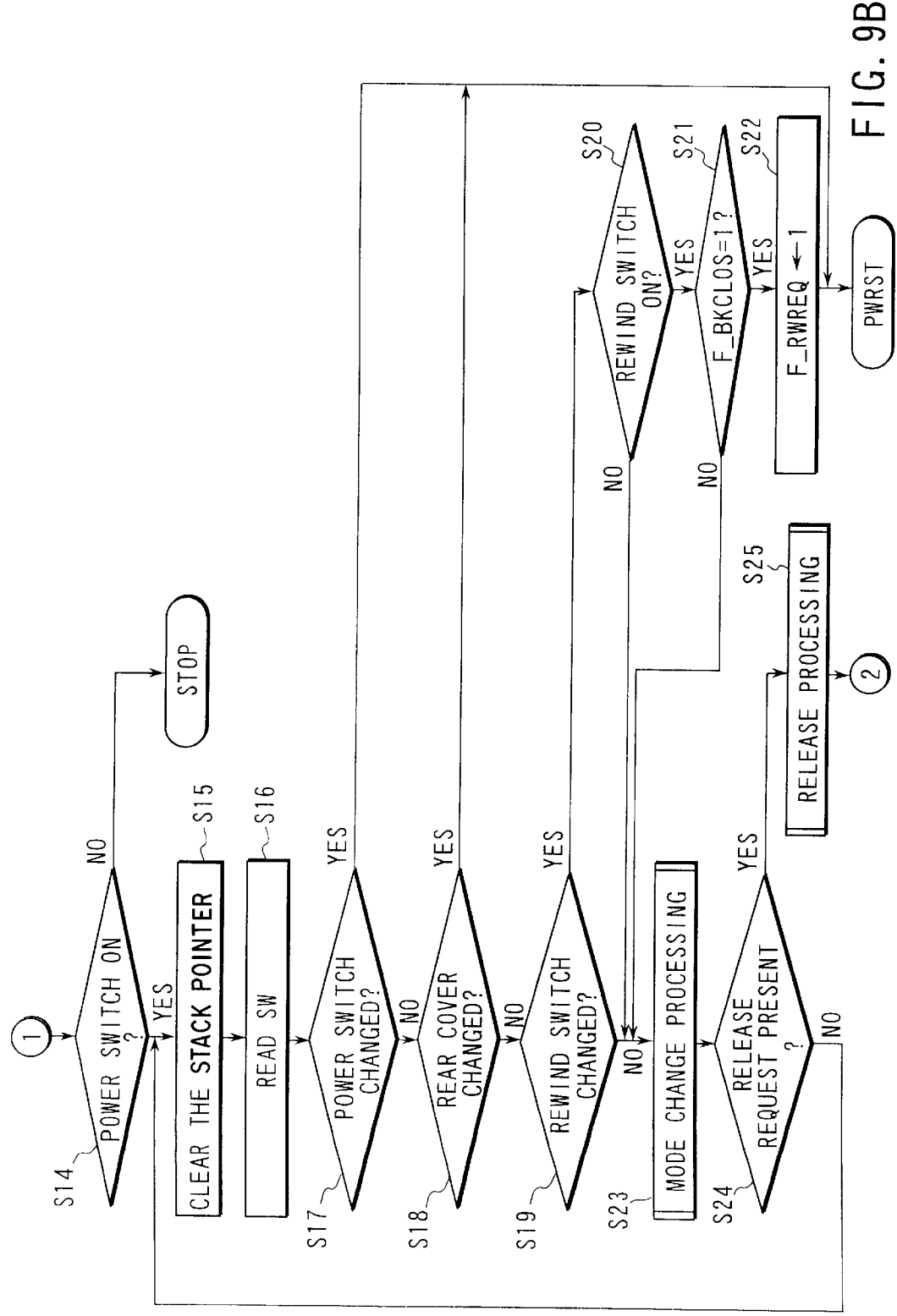

At step S23 in the flowchart of FIG. 9B, when the sub-routine of the mode change processing begins, at step 31, judgment is made whether or not the derivative mode switch $41_1$ (DMSW1) is turned on which serves as the mode change switch used at the time of the first specification.

Here, when the derivative mode switch 41₁ is turned on, the CPU proceeds to step S35.

On the other hand, when the derivative mode switch 41₁ is not turned on, at step 32, judgment is made whether or not the derivative mode switch 41₂ (DMSW2) is turned on which serves as the mode change switch used at the time of the second specification. Then, at step S32, when the derivative mode switch 41₂ is turned on, the CPU 50 proceeds to step S40.

Furthermore, at steps S31 and S32, when neither the derivative mode switch 41₁ nor 41₂ is turned on, the CPU 50 proceeds to step S33.

At step 533, judgment is made whether or not the first release detection switch (1R switch) 76 is turned on which is the first step of the release detection switch which is the two-step switch for starting the photographing operation. Here, when the first release detection switch 76 is turned on, the CPU 50 returns to the main flowchart after the release request is set at the following step S34. Furthermore, when the first release detection switch 76 is not turned on at step S33, the CPU 50 returns to the main flowchart as it is.

At step S35, judgment is made whether or not the mode is currently set to the catch-light mode. Here, when the mode is set to the catch-light mode, the CPU 50 proceeds to step S36, so that the red eye alleviation mode is selected. In this case, the mark 174b corresponding to the mark 176b of the LCD display window 36₁ shown in FIG. 8A is lit and displayed. After this, the CPU 50 returns to the main flowchart.

On the other hand, at step S35, when the current mode is not set to the catch-light mode, the CPU 50 proceeds to step S37 to judge whether or not the mode is set to the red eye alleviation mode. Here, when the current mode is set to the red eye alleviation mode, the CPU 50 proceeds to step S38, so that the red eye alleviation mode is relived. Then, after that, the CPU 50 returns to the main flowchart. Furthermore, when the mode is not set to the red eye alleviation mode at step S37, the CPU 50 proceeds to step S39. Then, after the catch-light mode is selected, the CPU 50 returns to the main flowchart.

As has been described above, the mode can be changed from the mode-unset state to the catch-light mode, the. red eye alleviation mode and then to the mode-unset mode by the operation of the derivative mode switch 41₁ (DMSW1).

On the other hand, in the case where the derivative mode switch 41₁ (DMSW1) is not turned on, and the derivative mode switch 41₂ (DMSW2) is turned on, the CPU 50 proceeds to step S40 to judge whether or not the mode is currently set to the infinite mode.

Here, when the mode is set to the infinite mode, the CPU 50 proceeds to step S41 to select the continuous photography mode. In this case, the mark 174b corresponding to the mark 178b of the LCD display window 36₂ shown in FIG. 8B is lit and displayed. After this, the CPU 50 returns to the main flowchart. On the other hand, when the mode is not set to the infinite mode at step S40, the CPU 50 proceeds to step S42.

At step S42, judgment is made whether or not the mode is currently set to the continuous photography mode. Here, when the mode is set to the continuous photography mode, the CPU 50 proceeds to step S43 to return to the main flowchart after the continuous photography mode is relieves. On the other hand, when the mode is not set to the continuous photography mode, the CPU 50 proceeds to step S44, so that the infinite mode is selected. In this case, the mark 174a corresponding to the mark 178a of the LCD window 36₂ shown in FIG. 8B is lit and displayed. After this, the CPU 50 returns to the main flowchart.

In this manner, the mode of the derivative mode switch 41₂ (DMSW2) also can be subsequently changed in a similar manner as the derivative mode switch 41₁.

Figure 11A:
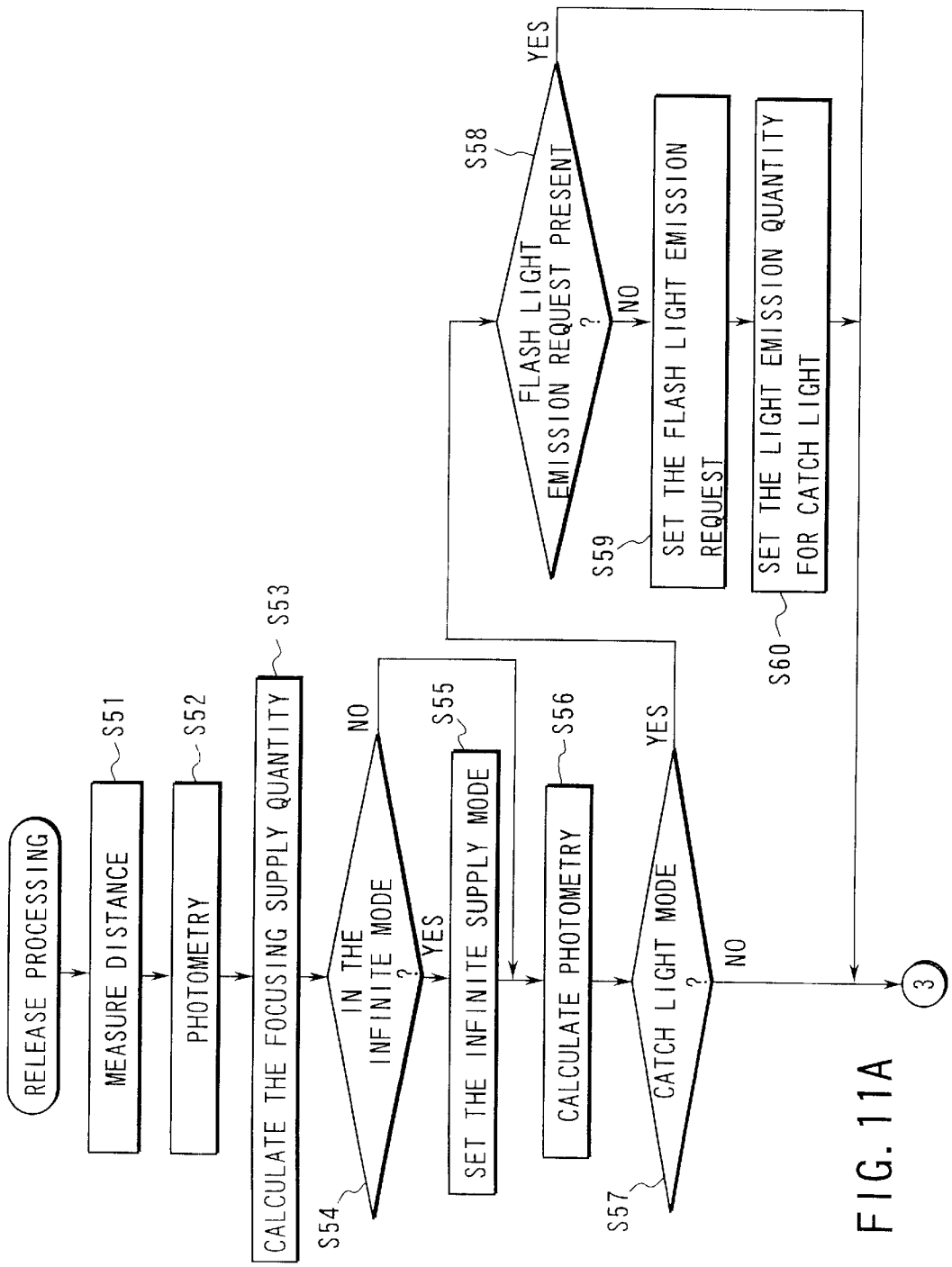
FIGS. 11A and 11B are the flowcharts for explaining the operation of the sub-routine "release processing" at step 25 of the flowchart of FIG. 9B.
Figure 11B:
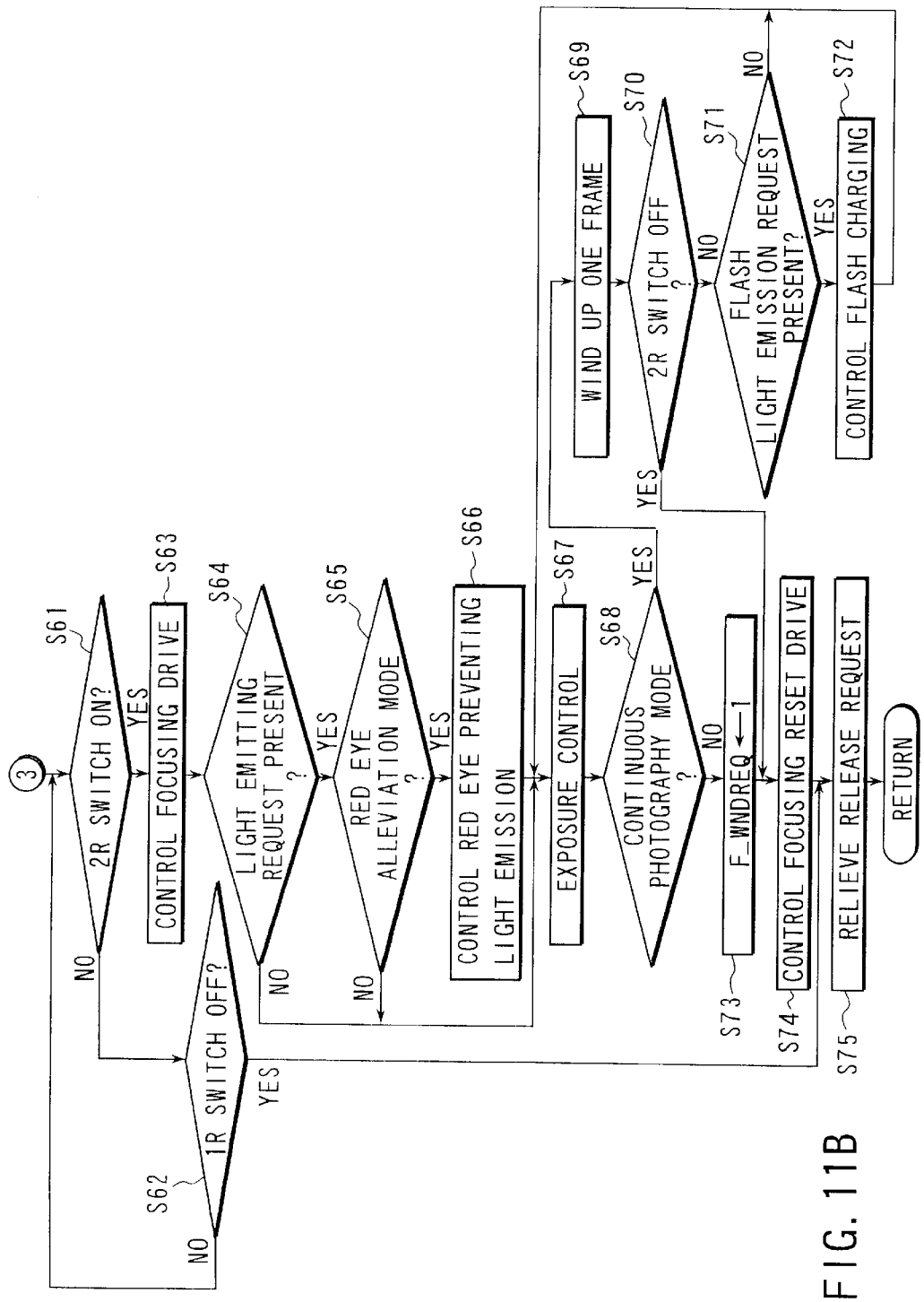

Next, an operation of the sub-routine of the release processing will be explained by referring to FIGS. 11A and 11B.

At step S25 in the flowchart of FIG. 9B, when the sub-routine of the release processing begins, the distance to the subject to be photographed is measured at step S51 in the beginning. Next, at step S52, the brightness to the subject to be photographed is measured. Then, at step S53, the supply quantity of the focusing lens for the adjustment of the focal point is calculated on the basis of the result of the distance measurement obtained at step S51 described above.

Furthermore, at step S54, judgment is made whether or not the mode is currently set to the infinite mode. Here, when the mode is set to the infinite mode, the CPU proceeds to step S55. When the mode is not set to the infinite mode, the CPU 50 proceeds to step S56. At step S55, the supply quantity of the focusing lens is set so that the focal point is set on the subject in the infinite distance.

At step S56, the photometry calculation for the shutter control is conducted on the basis of the result of photometry obtained at step S52. When needed, the flashlight emission request is set.

Then, at step S57, judgment is made whether or not the current mode is set to the catch-light mode. When the mode is set to the catch-light mode, the CPU 50 proceeds to step S58. When the mode is not set to the catch-light mode, the CPU 50 proceeds to step S61.

At step S58, judgment is made whether or not a flashlight emission request is made. Here, in the case where the flashlight emission request is made, the CPU 50 proceeds to step S61. When the flashlight emission request is not mode, the CPU 50 proceeds to step S59. Then, at step S59, the flashlight emission request is set. Then, at the subsequent step S60, the flashlight emitting quantity for the catch light is set.

At step S61, judgment is made whether or not the second step switch of the release detection switch which is the two step switch, namely the second release detection switch 78 is turned on. Here, when the second release detection switch 78 is not turned on, the CPU 50 proceeds to step 62. When the second release detection switch 78 is turned on, the CPU 50 proceeds to step S63.

Furthermore, at step S62, judgment is made whether or not the first step switch of the release detection switch which is the two-step switch, namely the first release switch detection switch 76 is turned off. Here, when the first release detection switch 76 is not turned off, the CPU proceeds to step S61. When the first release detection switch 76 is turned off, the CPU 50 proceeds to step S75.

At step S63, when the infinite mode is not selected, the focusing lens drive control which is the focus adjustment operation is conducted on the basis of the calculation of the focusing supply quantity obtained at step S53. When the infinite mode is selected, the focusing lens drive control is conducted on the basis of the infinite supply quantity obtained at step S55 described above. Next, at step S64, judgment is made whether or not the flashlight emission request is set. Here, when the flashlight emission request is not set, the CPU 50 proceeds to step S67. When the flashlight emission request is set, the CPU 50 proceeds to step S65.

At step S65, judgment is made whether or not the mode is set to the red eye alleviation mode. Here, when the current mode is not set to the red eye alleviation mode, the CPU 50 proceeds to step S67. On the other hand, when the current mode is set to the red eye alleviation mode, the CPU 50 proceeds to step S66, so that the flashlight emission control is conducted for the red eye alleviation.

Then, at step S67, the shutter is opened and closed on the basis of the result of photometry calculation obtain at step S56. If the flashlight emission request is set, the flash emits light when the shutter is opened and closed. In particular, when the light emission quantity for the catch light is set at step S60 in the case where the catch-light mode is particularly selected, the flash emits light on the basis of the light emission quantity for the catch light. When a series of exposure control is completed at step S67, the CPU 50 proceeds to step S68 to judge whether or not the mode is set to the continuous photography mode.

When the mode is not set to the continuous photography mode at step S68, the CPU 50 proceeds to step S73, so that the flag F_WINDREQ is set to "1", the flag representing the request for winding up of the film. On the other hand, when the mode is set to the continuous photographing mode at step S68, the CPU 50 proceeds to step S69 to conduct an operation of winding up the film for one frame portion.

Next, at step 70, judgment is made whether or not the second release detection switch 78 is turned off. Here, when the second release detection switch 78 is turned off, the CPU 50 proceeds to step S74. When the second release detection switch 78 is not turned off, the CPU 50 proceeds to step S71.

At step S71, judgment is made whether or not the flashlight emission request is set. Here, at step S71, judgment is made that the flashlight emission request is made, the CPU 50 proceeds to step S72 to control the charging of the capacitor for flashlight emission only in the quantity required for the flashlight emission. After that, the CPU 50 proceeds step S67 to conduct the exposure control again. On the other hand, when the flashlight emission request is not set at step S71, the CPU proceeds to step S67 to conduct the exposure control again.

At step S74, the focusing reset drive control is conducted at step S63 for bringing the focusing lens driven and controlled back to the initial position. Next, at step S75, after the release request is relieved, the CPU 50 returns to step S8 of the main flowchart.

According to the embodiment which has been described in detail, it is possible to manufacture a camera which has a first specification and a second specification which can be changed only by a simple replacement of an LCD window, the first specification being added with a catch-light mode which enables brightening the pupil of the eye of the subject to be photographed by the flashlight emission separately from the portrait photography and a red eye alleviation mode which enables the alleviation of the red eye phenomenon by the flashlight emission prior to the photography at the time of the flashlight photography, the second specification being added with the infinite mode which enables the adjustment of the focus to the subject in the infinite distance, and a continuous photography which enables continuous photography by a continuation of the pressing of the release button.

In this manner, it is possible to provide a camera which enables the selection of a plurality of specifications by replacing the LCD window on which the first mode setting button is fixed. Consequently, it becomes easy to change the specification at times other than the time of manufacturing the camera in accordance with the usage of the camera.

Furthermore, in this embodiment, the enlargement of the LCD can be prevented so that an attempt can be made to reduce the size of the camera apparatus because a large number of display portions corresponding to a plurality of specifications are not required to be provided on the LCD by forming a display of each mode corresponding to the first specification and the second specification on the LCD window by means of printing or the like, so that a geometric display is lit on the LCD at a position corresponding to the display.

Incidentally, in the embodiment described above, the selection by each derivative mode switch is set to three, two modes and no selection of modes. It goes without saying that a large number of modes can be selected or only one mode can be selected. Furthermore, when an LCD window having no first mode setting button is attached on the camera, it is possible to simply manufacture a camera with a third specification having no mode set by the first mode setting button added at all.

Besides, in the contact portion at the bottom portion of the first mode setting mode, the configuration of the first mode setting button can be commonly used by providing a conductive printing, so that the first mode setting button can be manufactured in a single mold thereby preventing an increase in the cost. However, the first mode setting button may be formed by means of an insert mold so that the contact portion can be formed with a conductive material.

Furthermore, when the top portion and the color of the first mode setting button are changed in the first specification, the selection of the specification can be detected at a first glace, which is very convenient.

Furthermore, the configuration and the structure of the conductive portion and the land pattern which are constituted on the contact portion of the first mode setting button by means of conductive printing are not restricted to the embodiments described above. For example, the land pattern is not restricted to the configuration shown in FIG. 6D. The first to the three patterns are provided. Thus, it goes without saying that the conductive portion of the first mode setting button can be formed in other patterns when the first pattern and the second pattern are conducted, and the second pattern and the third pattern are conducted.

In addition, an explanation has been made that the first mode setting button has two kinds of conductive portions. It goes without saying that when the conductive portion can be optionally selected from the three kinds of conductive portions and more conductive portions in correspondence to the structures of the land pattern, such conductive portions can be applied to the present invention.

In the embodiment, as a geometric display of an LCD which is a display element, a triangle display is used such that one angle of the triangle is located opposite to the side of the display for instructing each kind of mode comprising characters or pictures formed by printing on the LCD window. It goes without saying that any configuration will do if the geometric display thereof is such that the display shows which mode is currently selected visually in a manner easily understandable for photographers. For example, a round configuration or an arrow can be used. Furthermore, it is desired that the display provided on the LCD window can visually clarify which of the modes is selected. Otherwise, widely used picture characters or characters representing the name of the mode itself may be used.

As has been described above, according to the first embodiment, there is provided a camera which enables the selection of a plurality of specifications with a simple structure and a simple work without increasing the cost thereof.

Furthermore, there is provided a camera which enables a display which can be easily understood by users without enlarging the size of the display element for displaying the state of the camera at the time of enabling the selection of a plurality of specifications.

Next, a second embodiment of the present invention will be explained.

In the second embodiment which will be described hereinafter, the confirmation of which specification is selected is made possible by setting the set position of the first mode setting button at different positions for each of the specifications to confirm the position of the first mode setting button.

Incidentally, in the second embodiment, like constituent elements as the first embodiments are denoted by, like reference numerals, and the explanation thereof is omitted.

Figure 12:
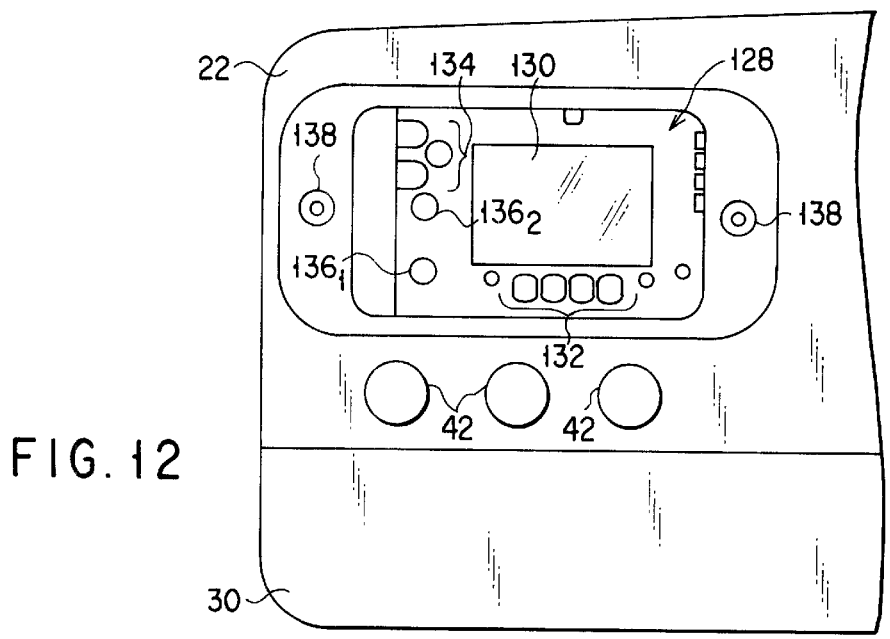
FIG. 12 is a view showing the camera as seen from the top surface portion thereof in the state in which the LCD window 36 according to the second embodiment of the invention is detached from the front cover 22.

FIG. 12 is a view showing the camera as seen from the top surface portion thereof in the state in which the LCD window 36 is detached from the front cover 22.

On a position corresponding to the display portion 120 of the LCD window 36 described above on the top surface portion of the cover 22, the LCD 130 as the display element is arranged. On the periphery of the LCD 130, a plurality of check lands 132 and 134 for adjustment and lands $136_1$ and $136_2$ for the first mode setting buttons or the like are arranged. Furthermore, in the vicinity of the both end portions end portion of the opening 128, bosses 138 and 138 are provided which are screwed with screws 38 and 38.

FIGS. 13A and 13B are views showing a main substrate on which the LCD 130 or the like are attached. FIG. 13A is a view showing a surface side thereof. FIG. 13B is a view showing a rear surface thereof.

As shown in FIG. 13A, a land 142 for the connection with the LCD 130 is provided on the surface side of the main substrate 140 in the vicinity of the check land 132. Furthermore, in the vicinity of the end portion of the main substrate 140, an operation button lands $136_1$ and $136_2$ for operation buttons corresponding to the first mode setting button 41 and the land 144 for the operation button corresponding to the second mode setting button 42 are provided respectively.

Here, the structures of the first mode setting button and the land pattern will be explained by referring to FIGS. 14A and 14B.

Figure 14A:
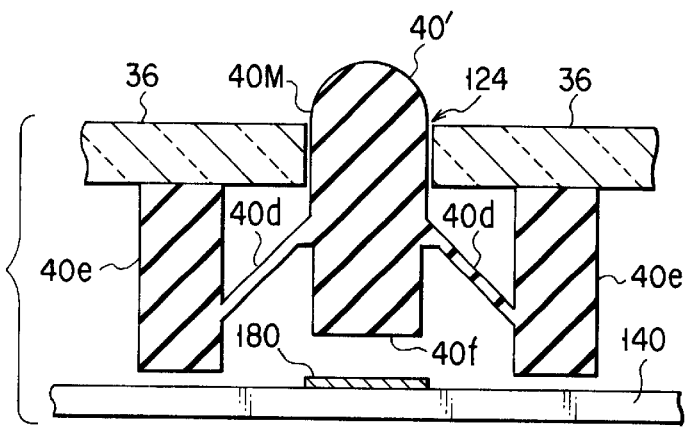
FIGS. 14A and 14B are views for explaining a structure of the first mode setting button 40 and the land pattern of the camera according to the second embodiment.

FIG. 14A is a sectional view showing a state in which the first mode setting button 40' is attached on the LCD window 36. FIG. 14B is a view showing an example of land patterns $136_1$ and $136_2$ of the first mode setting button corresponding to the first mode setting button 40'. Incidentally, the land patterns of the lands $136_1$ and $136_2$ for the first mode setting button 40'. As shown in FIGS. 12, 13A and 13B, the land patterns are provided on different positions of the main substrate 140, but the structure is the same.

In the first mode setting button 40', a circular contact portion 40f is formed on the bottom portion of the main body 40M which serves as the press button thereof. Then, the base portion 40e is attached on the rear surface of the LCD window 36 via a bellow 40d which is extended toward the periphery from the main portion 40M and which is constituted of an elastic member such as rubber or the like. As a consequence, the first mode setting button 40' becomes movable in the vertical direction along the hole 124.

Figure 14B:
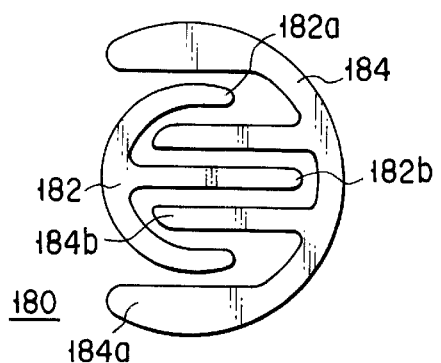

On the other hand, on the positions of the lands $136_1$ and $136_2$ for the first mode setting button on the main substrate 140, the land pattern is provided which has a configuration as shown in FIG. 14B.

The land pattern 180 comprises a first contact pattern 182 and a second contact pattern 184 which constitute an independent electric contact and a second electric contact, respectively.

The first contact pattern 182 has a first pattern 182a formed in an arc-like configuration and a second pattern 182b which extends through a center of a circle in a predetermined length from the first pattern 182a.

Furthermore, the second contact pattern 184 is concentric with the first contact pattern 182. The second contact pattern 184 has a first pattern 184a formed in an arc-like configuration having a larger diameter than the first pattern 182a, and a plurality of second patterns 184b which extend in a predetermined length toward the inside from the first pattern 184a. Incidentally, the second contact pattern 184 and the first contact pattern 182 are arranged so as not to come into contact with each other.

As described above, the first mode setting button 40' comprises a derivative mode switch (DMSW1) $41_1$ and a second derivative mode switch (DMSW2) $41_2$ having different contacts. Then, the land pattern 180 is formed with two contacts; a first contact and a second contact 182 and 184.

Consequently, the two contacts on the land pattern 180 as described above are allowed to conduct electricity by pressing the conductive portion 40f provided on the bottom portion of the first mode setting button 40' to constitute the derivative mode switch. Then, the land pattern 180 is provided on two positions (see FIG. 12 and FIGS. 13A and 13B) on the main substrate 140, and is set at a position corresponding to the land pattern 180 provided on the land $136_1$ for the first mode setting button and the land $136_2$ for the first mode setting button. With the first mode setting button arranged on the position shown in FIG. 15A, the derivative mode switch (DMSW1) 41 is constituted. Furthermore, with the first mode setting button arranged on the position shown in FIG. 15B, the derivative mode switch (DMSW2) $41_2$ is constituted.

That is, it becomes possible to easily change the first specification and the second specification by providing two land patterns 180 on different positions, and changing the attachment position of the first mode setting button 40' corresponding thereto.

Figure 15A:
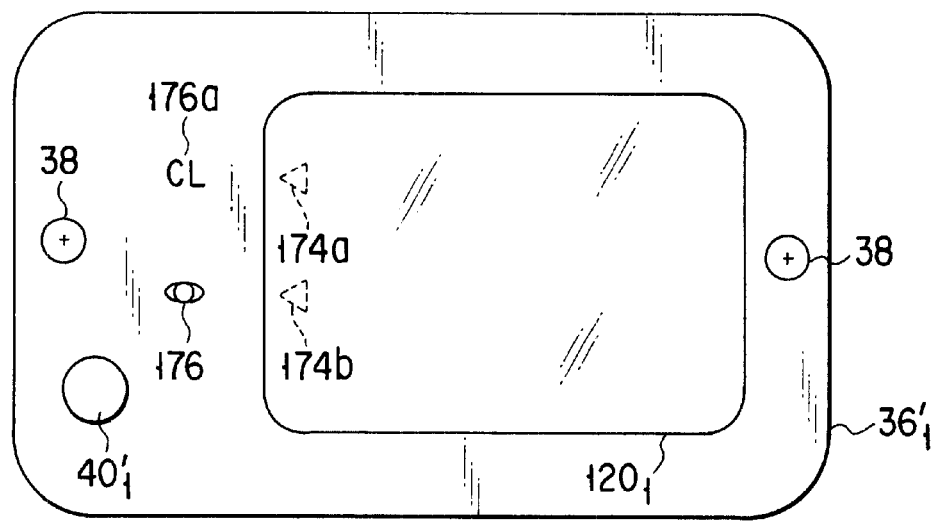
FIGS. 15A and 15B are views showing an example of LCD window on which different first mode setting buttons are attached in the camera according to the second embodiment of the present invention.
Figure 15B:
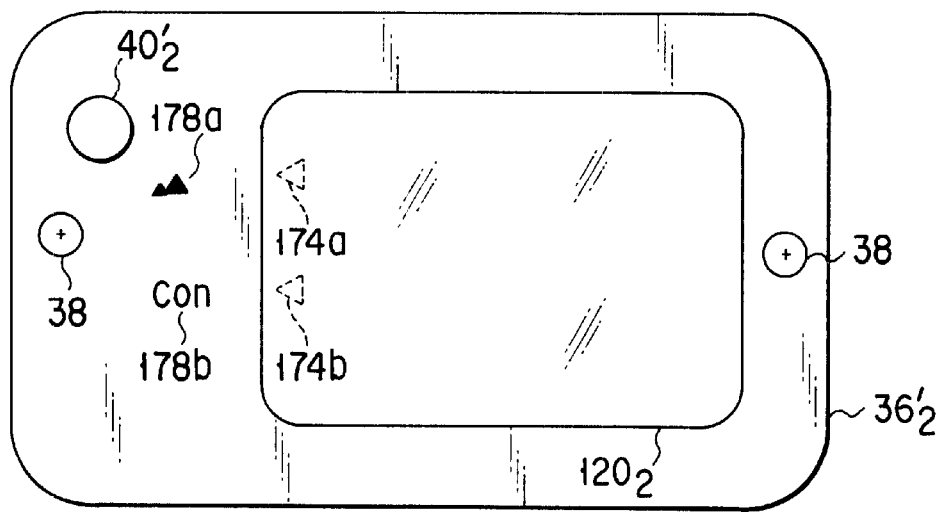

FIGS. 15A and 15B are views showing an example of an LCD window on which different first mode buttons described above are attached.

FIG. 15A is a view showing an example of the LCD window $36_1$' on which the first mode setting switch $40_1$' is attached which is the first specification.

In this case, as the first specification, the mark 176a representing the catch light mode (CL) and the mark 176b representing the red eye alleviation mode are displayed on the LCD window $36_1$' by printing or the like. Then, the marks 174a and 174b of the LCD 130 located on the side of the display portion $120_1$ are optionally displayed in accordance with the operation state of the derivative mode switch $41_1$.

That is, in the case where the catch light mode is selected, the mark 174a corresponding to the mark 176a is displayed. In the case where the red eye alleviation mode is selected, the mark 174b corresponding to the mark 176b is displayed. Furthermore, in this case, every time the derivative mode switch $41_1$ is turned on, the cycle of the catch light mode, the red eye alleviation mode, no selection of mode, the catch light mode and the like is repeated.

Incidentally, in the case where any of the catch light mode and the red eye alleviation mode is not selected, any of the marks 174a and 174b is not displayed.

In a similar manner, FIG. 15B shows an example of LCD window $36_2{'}$ on which the first mode setting button $40_2{'}$ is attached which is the second specification.

In this case, as the second specification, the mark 178*a* representing the infinite mode for the photography of far sights and the mark 178*b* representing a continuous photography mode are displayed by means of printing on the LCD window $36_2{'}$. Then, depending on the operation state of the derivative mode switch $41_2$, the marks 174*a* and 174*b* of the LCD 130 located on the side of the display portion $120_2$ is optionally displayed.

That is, in the case where the infinite mode is selected, the mark 174*a* corresponding to the mark 178*a* is displayed. In the case where thee continuous photography mode is selected, the mark 174*b* corresponding to the mark 178*b* is displayed. Furthermore, in this case, every time the derivative mode switch $41_2$ is turned on, the cycle of the infinite mode, the continuous photography mode, no selection of mode, infinite mode and the like is repeated.

Incidentally, in the case where any of the infinite mode and the continuous photography is selected, any of the mark 174*a* and the mark 174*b* is not displayed.

Incidentally, the operation of the camera according to the second embodiment is the same as the first embodiment except for the fact the first mode setting buttons $40_1$ and $40_2$ in the first embodiment are replaced with the first mode setting button $40_1{'}$ and $40_2{'}$. Thus, the explanation thereof is omitted.

In this manner, since the first mode setting button used in the first specification is provided at a position different from the first mode setting button used in the second specification. Thus, confirmation of the position of the first mode setting button enables an easy confirmation of which specification is selected without looking at the display in the LCD window.

Incidentally, in embodiments described above, the selection by each of the derivative mode switch is given in three modes; two modes and no selection of mode. It goes without saying that the third mode can be selected in the place of no selection of mode.

Furthermore, the first mode setting button is formed approximately in the same configuration, the top portion of the button may be formed in different configurations, for example, in the first specification and in the second specification.

Incidentally, in the embodiments described above, the selection by each of the derivative mode switches is given in three modes, two modes and selection of no mode. Larger number of modes can be selected. It goes without saying that only one mode can be selected. Furthermore, when an LCD window without the first mode setting button is attached on the camera, a third specification camera can be easily manufactured wherein a mode by the first mode setting button is not added at all.

Furthermore, the conductive portion by the conductive printing constituted on the contact portion of the bottom portion of the first mode setting button and the configuration and the structure of the land pattern are not restricted to the embodiments which have been described above. For example, the land pattern is not restricted to the configuration shown in FIG. 14B. In other words, a pair of land patterns having a second pattern provided thereon is provided. Thus, it goes without saying that the pattern having other configurations will do when the pair of land patterns are allowed to conduct electricity with this operation button.

Furthermore, in the embodiment, a pair of land patterns are provided on two places, so that the operation button is alternatively arranged on a position corresponding to the pair of land patterns respectively. When a land pattern on which corresponding buttons are arranged on two positions respectively, and a land pattern no corresponding buttons are arranged are prepared, the camera of a third specification and the camera of the fourth specification can be manufactured easily.

As has been described above, according to the second embodiment, there can be provided a camera wherein the change in the specification can be easily understood. by users without enlarging the size of a display element for displaying the state of the camera when the specification is made selectable.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A camera comprising:

a control circuit which corresponds to a first specification having a first predetermined mode, and a second specification having a second predetermined mode which is different at least in part from the first predetermined mode;

first switch patterns for changing to the first predetermined mode based on the first specification by outputting a first signal to the control circuit;

second switch patterns for changing to the second predetermined mode based on the second-specification by outputting a second signal to the control circuit;

an operation member which corresponds to one of the first switch patterns and the second switch patterns and which turns the corresponding switch patterns on or off when operated by a user while being attached to the camera; and a holding member on which the operation member is attached;

wherein the specification of the camera is changed by alternatively selecting and attaching the operation member.

2. The camera according to claim 1, wherein:

the operation member is attached with a pattern whose surface is rendered conductive within a predetermined first range in the case where the first specification is selected and is attached with a pattern whose surface is rendered conductive within a predetermined second range different from the first range when the second specification is selected;

the first switch patterns comprise a first electric contact provided at a position corresponding to the first range, and a second electric contact provided at a position corresponding to the first range and a second range; and the second switch patterns comprise the second electric contact and a third electric contact provided at a position corresponding to the second range.

3. The camera according to claim 1, wherein:

the first switch comprises a pair of electric contacts provided at a first position;

the second switch comprises a pair of electric contacts provided at a second position different from the first position; and the operation member is adapted to be attached at: (i) a position corresponding to the first position in order to effect the first specification, and (ii) a position corresponding to the second position in order to effect the second specification.

4. The camera according to claim 1, further comprising a substrate on which the first switch patterns, the second switch patterns and the control circuit are formed.

5. The camera according to claim 4, further comprising:
a holding member attachment portion on which the holding member is adapted to be attached;
contacts for communicating with the control circuit, the contacts being exposed at the holding member attachment portion when the holding member is not attached.

6. A camera comprising:
a first electric contact provided at a first position;
a second electric contact provided at a second position different from the first position of the first electric contact;
a third electric contact provided at a third position different from the first and second positions of the first electric contact and the second electric contact;
a control circuit for selecting and changing a mode of the camera every time a first signal is produced as a result of the first electric contact and the second electric contact being brought together, and every time a second signal is produced as a result of the second electric contact and the third electric contact being brought together; and
an attachment for holding one of a first operation member which enables the first electric contact and the second electric contact to be electrically connected, and a second operation member which enables the second electric contact and the third electric contact to be electrically connected,
wherein a user is enabled to selectively change a specification of the camera by operating one of the first and second operation members held to the camera by the attachment.

7. The camera according to claim 6, further comprising:
a display element for displaying a state of the camera; and
a protection member for covering the display element;
wherein the attachment is provided on the protection member.

8. The camera according to claim 6, further comprising:
a holding member attachment portion on which at least one of a first holding member for holding the first operation member and a second holding member for holding the second operation member is attached; and
a display element for displaying a state of the camera;
wherein the holding attachment portion is arranged in a periphery of the display element.

9. The camera according to claim 6, wherein the first electric contact, the second electric contact and the third electric contact are arranged on a same electric substrate.

10. A camera comprising:
a first switch which outputs a first signal when operated and which comprises a first pair of electric contacts for selecting a mode of the camera;
a second switch which outputs a second signal when operated which comprises a second pair of electric contacts for selecting the mode of the camera, said second switch being provided at a position different from a position of the first switch; and
an attachment portion on which one of: (i) a first holding member corresponding to a first operation member is attached to enable operation of the first switch, and (ii) a second holding member corresponding to a second operation member is attached to enable operation of the second switch;
wherein a specification of the camera is changed by selecting and attaching one of the first holding member and the second holding member, and operating a corresponding one of the first operation member and the second operation member.

11. The camera according to claim 10, further comprising a display element for displaying a state of the camera, and wherein one of the first holding member and the second holding member is arranged to cover the display element.

12. The camera according to claim 11, wherein:
the first holding member has a second switch protection portion which disables the second switch when the first holding member is attached to the attachment portion; and
the second holding member has a first switch protection portion which disables the first switch when the second holding member is attached on the attachment portion.

13. A camera comprising:
a first switch which outputs a first signal when operated and which corresponds to a first operation member for selecting a mode of the camera;
a second switch which outputs a second signal when operated and which corresponds to a second operation member for selecting the mode of the camera, said second switch being arranged at a position different from a position of the first switch;
wherein a specification of the camera is changed by optionally selecting and attaching one of the first operation member and the second operation member.

14. The camera according to claim 13, wherein the first operation member and the second operation member have a same configuration.

15. The camera according to claim 13, further comprising an attachment portion on which a holding member is attached, wherein the holding member enables one of the first operation member and the second operation member to be held and attached to the camera.

16. A camera comprising:
a control circuit which corresponds to a first specification having a first predetermined mode, and a second specification having a second predetermined mode which is different at least in part from the first predetermined mode;
a first switch which corresponds to the first specification and which outputs a second signal to the control circuit;
a second switch which corresponds to the second specification and which outputs a second signal to the control circuit;
an attachment portion on which one of: (i) a first operation member is arranged to operate the first switch when the first specification is selected, and (ii) a second operation member is arranged to operate the second switch when the second specification is selected;
wherein the control circuit changes the mode of the camera based on the first specification when the first signal is output, and changes the mode of the camera based on the second specification when the second signal is output.

17. The camera according to claim 16, further comprising:

a display element which displays a state of the camera; and a protection member attachment portion on which one of a first protection member and a second protection member is attached, wherein at least a part of each of the first and second protection members has a light-transmitting characteristic and wherein the first protection member covers the display element when the first specification is selected and enables attachment of the first operation member, and the second protection member covers the display element when the second specification is selected and enables the attachment of the second operation member.

18. The camera according to claim 17, further comprising:

mode selection display portions for displaying the mode of the camera on the display element; and one of: (i) a first mode display portion which is provided in the first protection member and which comprises at least one of a character, a picture and a symbol representing the first predetermined mode of the first specification, and (ii) a second mode display which is provided in the second protection member and which comprises at least one of a character, a picture and a symbol representing the second predetermined mode of the second specification;

wherein the control circuit controls the mode selection display portions to correspond with one of the first mode display portion and the second mode display portion in accordance with the selected mode.

19. The camera according to claim 16, wherein:

the first switch comprises a first electric contact and a second electric contact, and the second switch comprises the second electric contact and a third electric contact; and the first electric contact, the second electric contact and the third electric contact are arranged on an electric substrate.

20. The camera according to claim 16, further comprising:

a display element for displaying a state of the camera; and a protection member covering the display element and having the attachment portion.

21. The camera according to claim 16, further comprising a holding member attachment portion on which one of: (i) a first holding member is held for holding the first operation member when the first specification is selected, and (ii) a second holding member is held for holding the second operation member when the second specification is selected.

22. The camera according to claim 16, further comprising a display element for displaying a state of the camera, and wherein one of the first holding member and the second holding member is arranged to cover the display element.

23. A method for manufacturing a camera comprising:

manufacturing an assemblage of parts which corresponds to a first specification and a second specification, wherein said assemblage includes a first switch for selecting a first mode based on the first specification, a second switch for selecting a second mode based on the second specification, and a control circuit for selecting and changing the mode in accordance with one of the first specification and the second specification in accordance with outputs of the first switch and the second switch; and selecting one of the first specification and the second specification;

wherein the camera of the first specification is produced by attaching an operation member which operates the first switch when operated by a user while being attached to the camera, and the camera of the second specification is produced by attaching an operation member which operates the second switch when operated by a user while being attached to the camera.

* * * * *